US010523391B2

United States Patent
Lim et al.

(10) Patent No.: US 10,523,391 B2
(45) Date of Patent: Dec. 31, 2019

(54) METHOD AND APPARATUS FOR GENERATING REFERENCE SIGNAL IN WIRELESS COMMUNICATION SYSTEM

(71) Applicant: Samsung Electronics Co., Ltd., Suwon-si, Gyeonggi-do (KR)

(72) Inventors: Jongbu Lim, Seoul (KR); Chanhong Kim, Suwon-si (KR); Taeyoung Kim, Seoul (KR); Jiyun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 15/853,261

(22) Filed: Dec. 22, 2017

(65) Prior Publication Data

US 2018/0183554 A1 Jun. 28, 2018

(30) Foreign Application Priority Data

Dec. 23, 2016 (KR) .......................... 10-2016-0178313

(51) Int. Cl.
*H04W 24/10* (2009.01)
*H04L 5/00* (2006.01)
*H04W 88/08* (2009.01)
*H04W 88/02* (2009.01)

(52) U.S. Cl.
CPC ............ *H04L 5/0048* (2013.01); *H04L 5/005* (2013.01); *H04L 5/0091* (2013.01); *H04W 24/10* (2013.01); *H04W 88/02* (2013.01); *H04W 88/08* (2013.01)

(58) Field of Classification Search
CPC ...... H04L 5/0048; H04L 5/0091; H04L 5/005; H04W 24/10; H04W 88/02; H04W 88/08
See application file for complete search history.

(56) References Cited

U.S. PATENT DOCUMENTS

| | | |
|---|---|---|
| 2003/0174643 A1 | 9/2003 | Ro et al. |
| 2010/0014481 A1 | 1/2010 | Ko et al. |
| 2010/0331032 A1* | 12/2010 | Lipka ................. H04B 7/01 455/509 |
| 2014/0044054 A1 | 2/2014 | Kim et al. |
| 2014/0105040 A1* | 4/2014 | Baker ................. H04W 52/367 370/252 |
| 2014/0177525 A1* | 6/2014 | Aydin ................. H04W 4/70 370/328 |
| 2015/0319757 A1 | 11/2015 | Baldemair et al. |
| 2016/0242170 A1* | 8/2016 | Xu ..................... H04W 4/70 |
| 2017/0288743 A1* | 10/2017 | Nam .................. H04B 7/024 |

(Continued)

*Primary Examiner* — Jay P Patel

(57) ABSTRACT

The present disclosure is related to the 5G or pre-5G communication systems for supporting a higher data transfer rate than that of the 4G communication system, such as LTE. A method according to an embodiment of the present disclosure may include receiving user equipment (UE) status information at least one UE, determining a density and pattern of a measured reference signal (MRS) based on the received UE status information and previously stored status information of active UEs, providing information about the determined density and pattern of the MRS to at least one active UE within a coverage area of the eNB, transmitting the MRS in a predetermined period based on the determined density and pattern, and transmitting the MRS based on the determined density and pattern and data to be provided to the at least one active UE.

20 Claims, 43 Drawing Sheets

(56) References Cited

U.S. PATENT DOCUMENTS

2018/0067203 A1* 3/2018 Lee .................. G01S 5/0205
2018/0241508 A1* 8/2018 Chervyakov ......... H04L 5/0051
2018/0302817 A1* 10/2018 Teshima ............... H04W 24/10

* cited by examiner

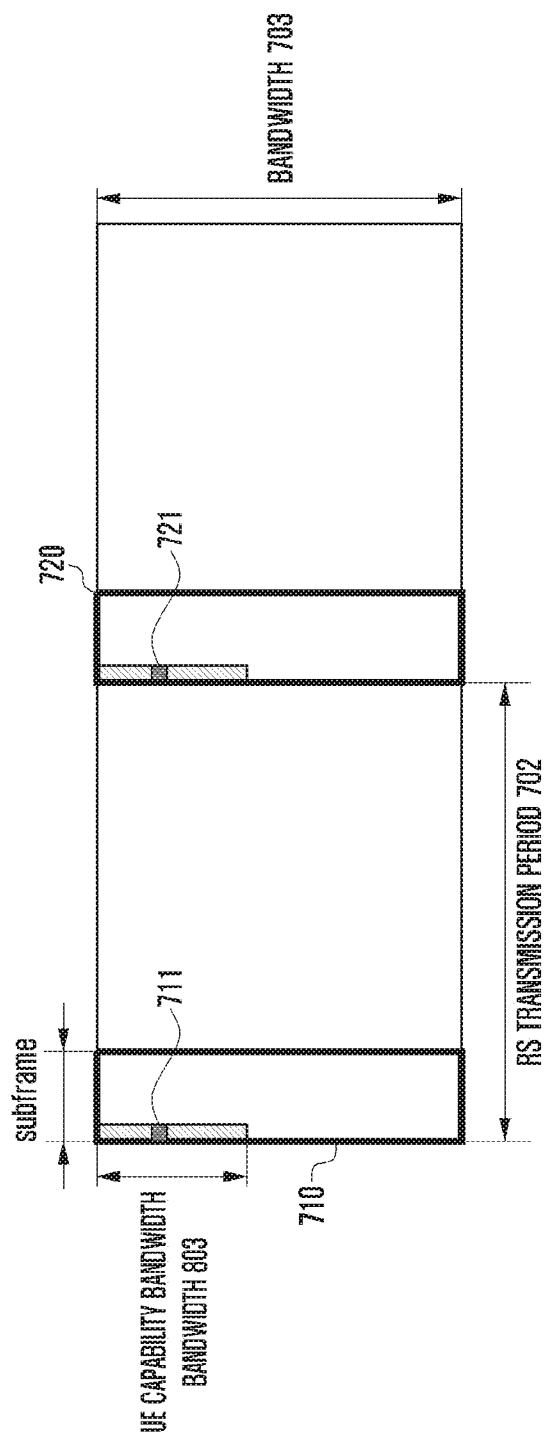

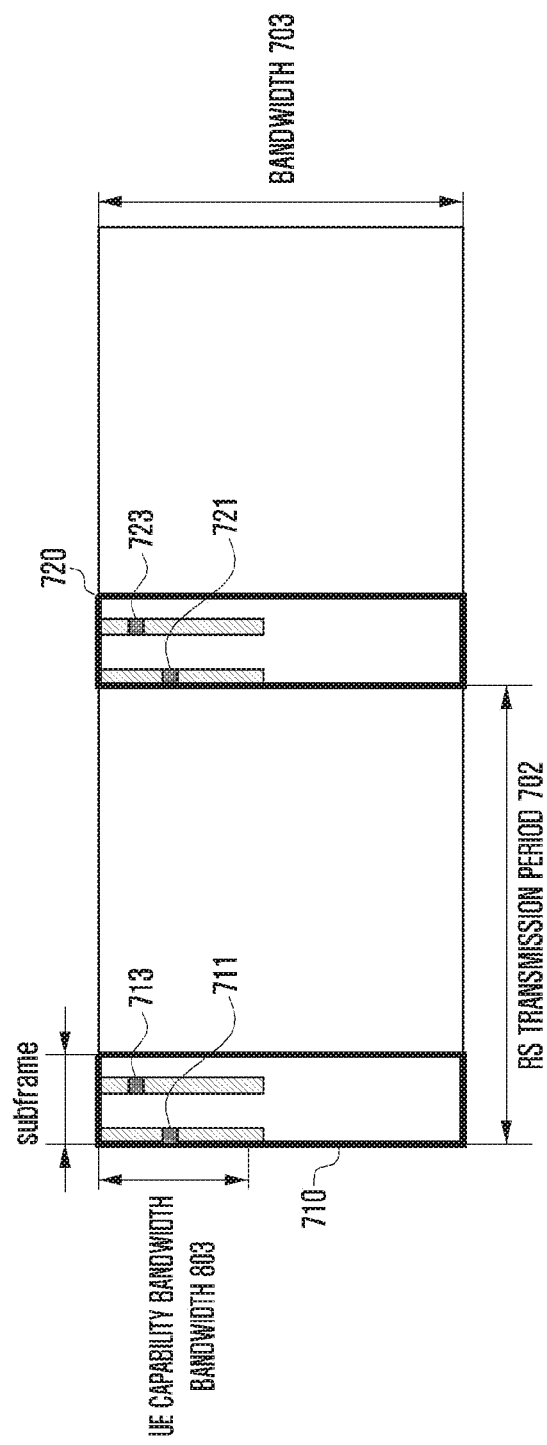

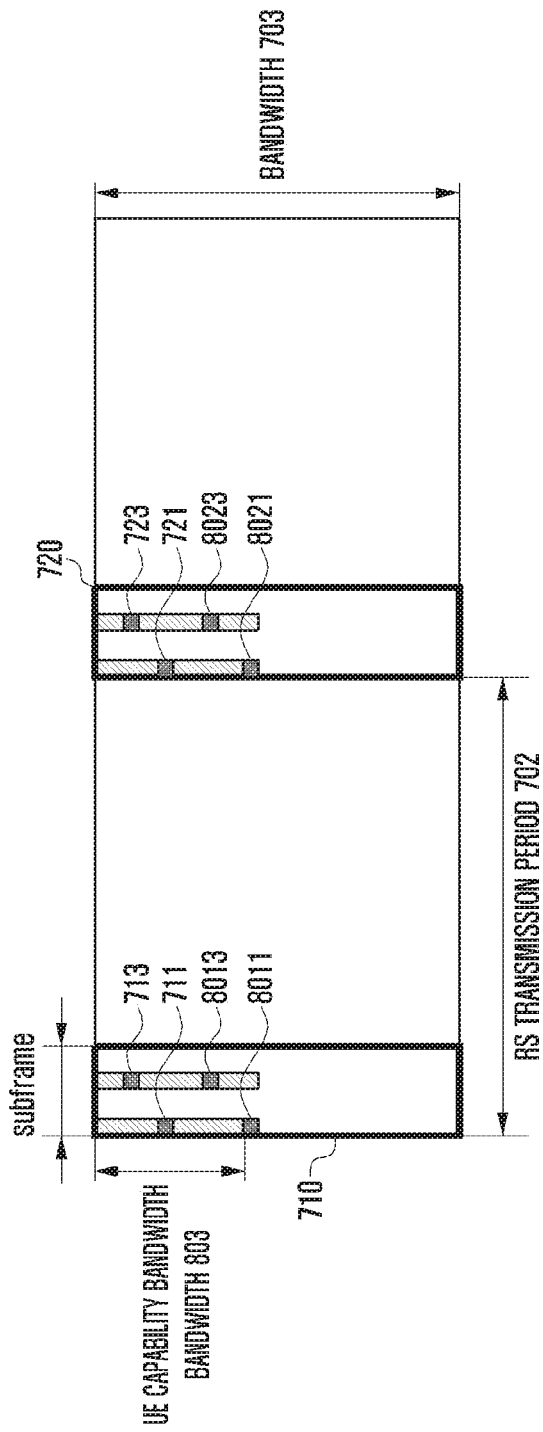

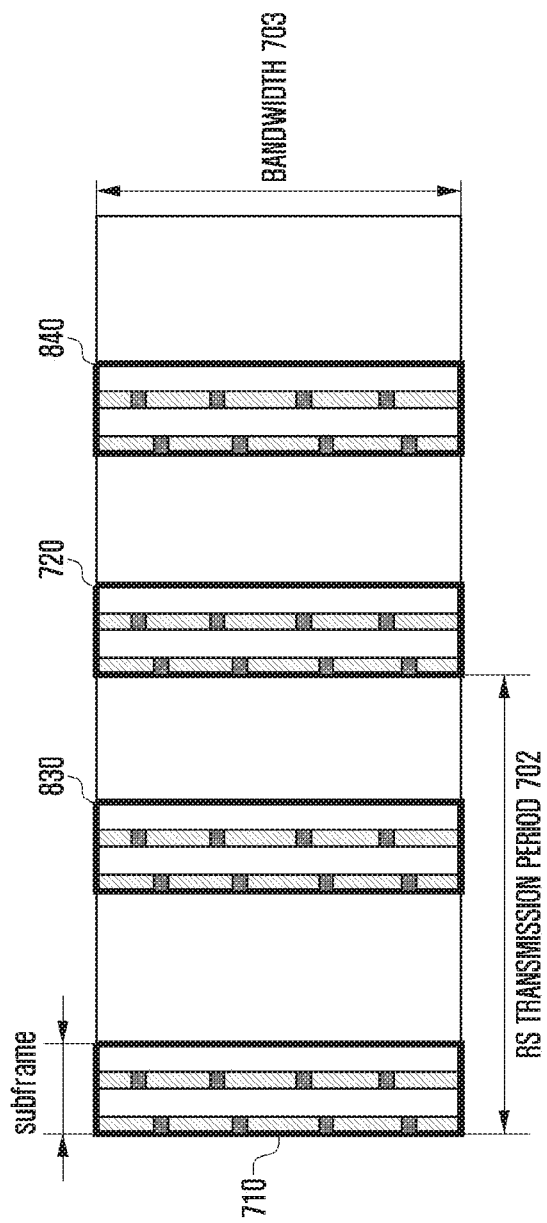

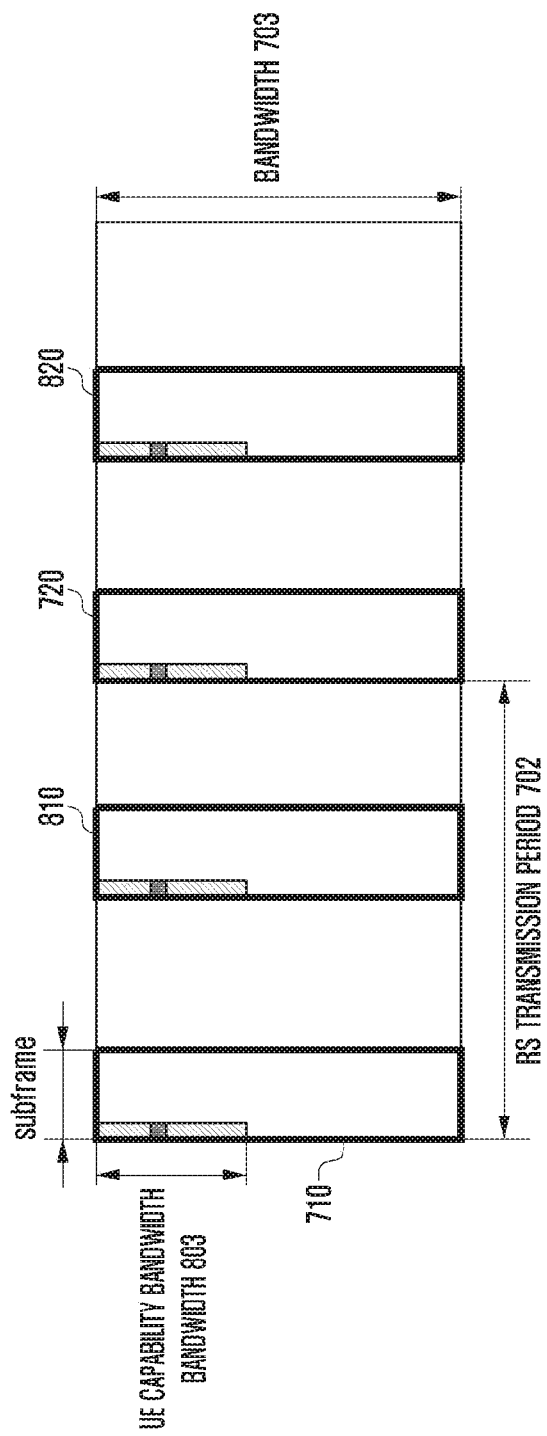

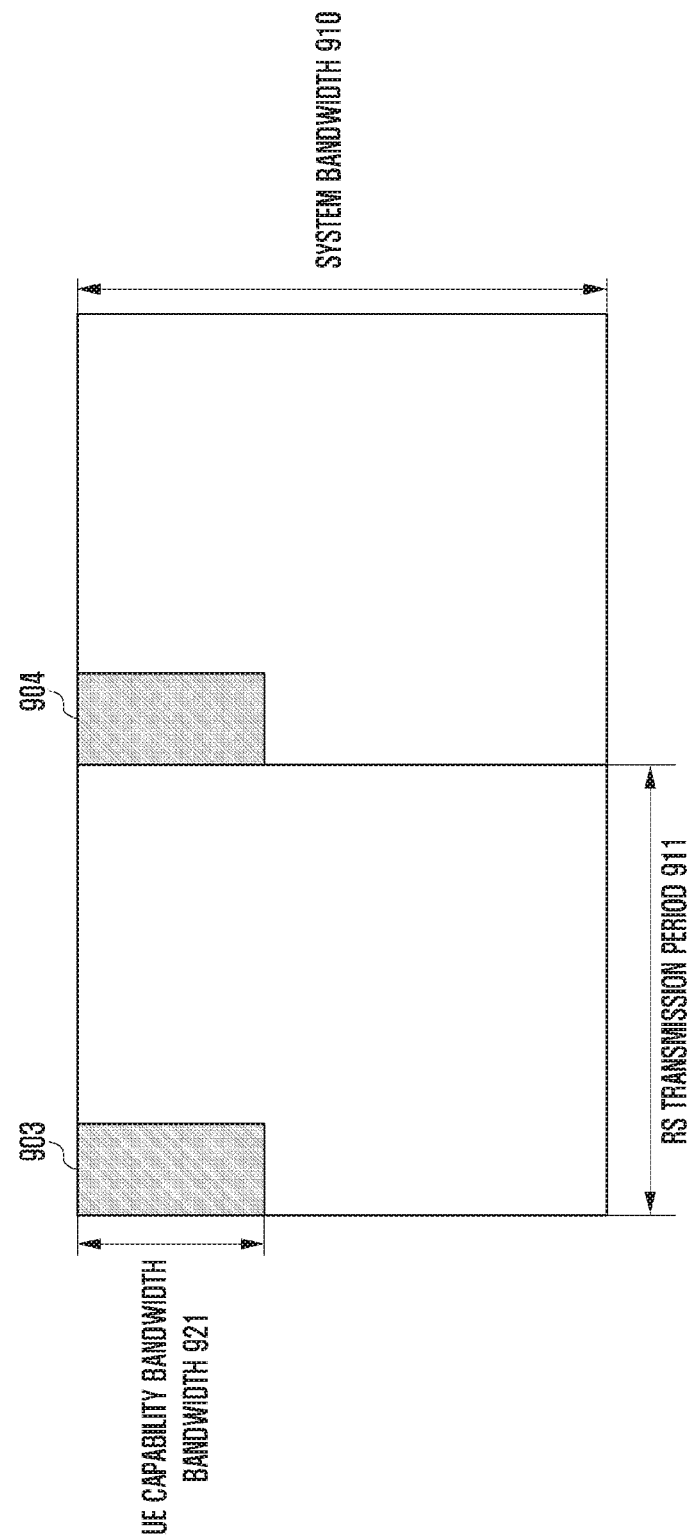

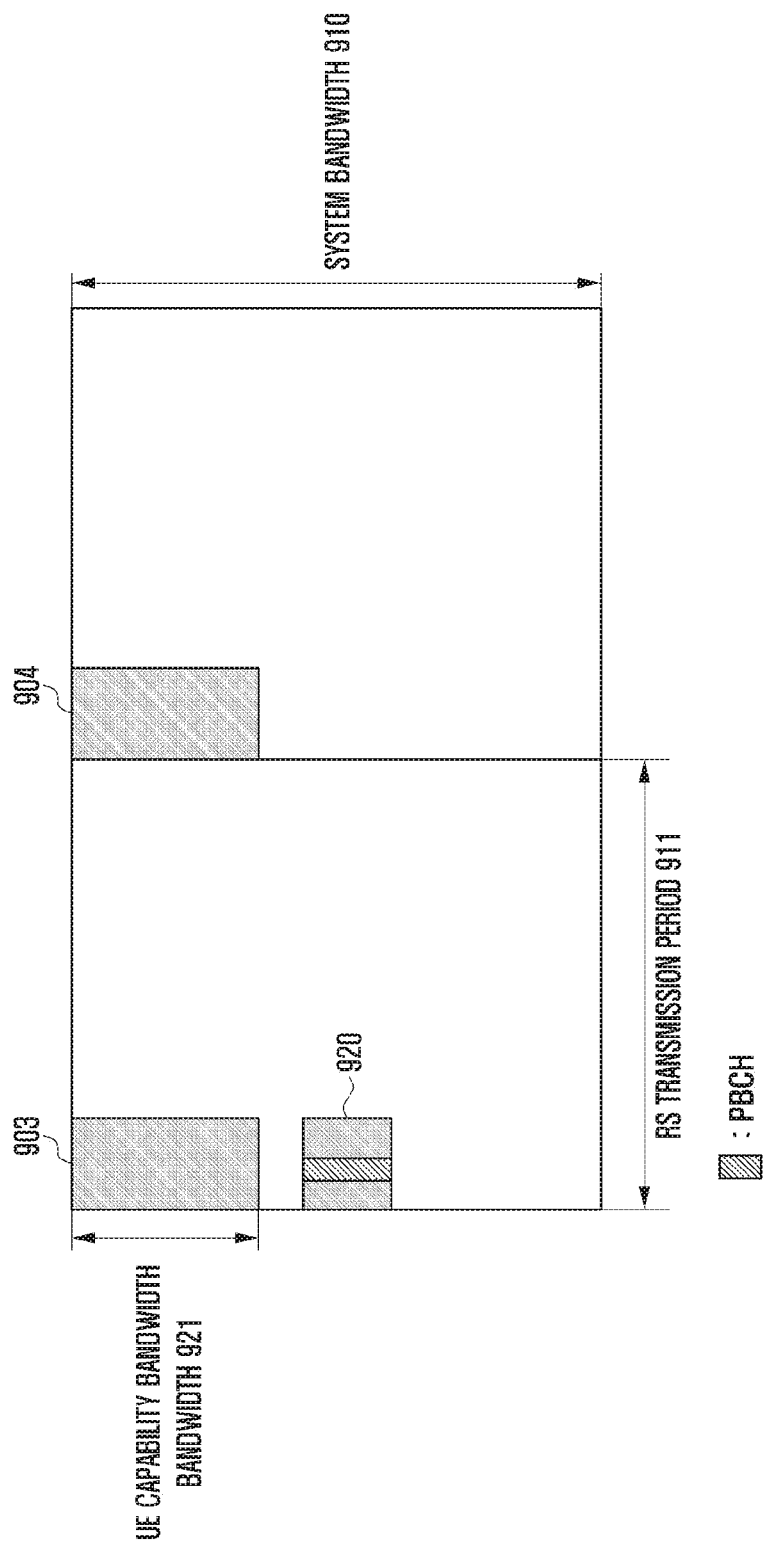

METHOD AND APPARATUS FOR GENERATING REFERENCE SIGNAL IN WIRELESS COMMUNICATION SYSTEM

CROSS-REFERENCE TO RELATED APPLICATION AND CLAIM OF PRIORITY

This application is related to and claims priority to Korean Patent Application No. 10-2016-0178313 filed on Dec. 23, 2016, the contents of which are incorporated herein by reference.

TECHNICAL FIELD

The present disclosure relates to a method and apparatus for generating a reference signal in a wireless communication system and to a method and apparatus for generating a reference signal by taking a new service into consideration.

BACKGROUND

In order to satisfy a wireless data traffic demand that tends to increases after the 4G communication system commercialization, efforts to develop an improved 5G communication system or pre-5G communication system is being made. For this reason, the 5G communication system or pre-5G communication system is called a beyond 4G Network communication system or a post LTE system.

In order to achieve a high data transfer rate, the 5G communication system is considered to be implemented in a very high frequency (mmWave) band (e.g., 60 GHz band). In order to reduce a path loss of electric waves and increase the transfer distance of electric waves in the very high frequency band, beamforming, massive MIMO, full dimensional MIMO (FD-MIMO), array antenna, analog beamforming and large scale antenna technologies are being discussed in the 5G communication system.

Furthermore, in order to improve the network of a system, technologies, such as an evolved small cell, an advanced small cell, a cloud radio access network (cloud RAN), an ultra-dense network, device to device communication (D2D), wireless backhaul, a moving network, cooperative communication, coordinated multi-points (COMP) and interference cancellation, are being developed in the 5G communication system.

In addition to this, in the 5G system, hybrid FSK and QAM modulation (MANI) and sliding window superposition coding (MSC) that are advanced coding modulation (ACM) schemes, filter bank multi-carrier (FBMC), non-orthogonal multiple access (NOMA) and sparse code multiple access (SCMA) that are an advanced access technology are being developed.

The first object of such a wireless communication system was to provide voice service while providing the activity of a user, but the wireless communication system has recently been developed to transmit more data. Recently, one of the most representative examples of the wireless communication system is the LTE system.

Furthermore, all of wireless communication systems are configured to transmit a reference signal in order to use the reference signal for various purposes, such as estimating a channel, depending on the distance between a transmission device and a reception device and a channel environment. In the LTE system, the most representative reference signal is a cell-specific reference signal (CRS) and transmitted in a full band every subframe/TTI. The CRS may be used for various purposes, such as channel estimation, QoS measurement, mobility measurement and time/frequency synchronization. In LTE, there are various reference signals having overlapped functions in addition to the CRS. For example, the various reference signals include a demodulation reference signal (DMRS) for channel estimation and a channel state information reference signal (CSI-RS) for QoS measurement.

A CRS used in the existing LTE is transmitted in a full band every subframe/TTI as described above. Accordingly, interference between neighboring cells is generated, and energy consumption of a network is increased because an active mode is maintained although there is no data to be transmitted. Furthermore, in LTE, the support of backward compatibility needs to be taken into consideration whenever a new transmission/reception mode/scheme is applied. Accordingly, in the LTE system, other RSs (e.g., a DMRS and a CSI-RS) are added and used while maintaining a CRS transmission method for channel estimation. Accordingly, different types of RSs performing the same function are present, and thus there is a problem in that an increase of RS overhead is caused.

SUMMARY

To address the above-discussed deficiencies, it is a primary object to provide an apparatus and method capable of reducing overhead of a reference signal in a new wireless communication system.

Furthermore, an embodiment of the present disclosure provides an apparatus and method capable of reducing interference between neighboring cells by minimizing an always-on signal.

Furthermore, an embodiment of the present disclosure provides an apparatus and method for transmitting a reference signal, which can reduce energy consumption of a network.

Furthermore, an embodiment of the present disclosure provides an apparatus and method for increasing frequency efficiency and user throughput in a cell edge by minimizing an always-on signal in a new wireless communication system.

Furthermore, an embodiment of the present disclosure provides an apparatus and method for transmitting a reference signal, which can support forward compatibility in a new wireless communication system.

Furthermore, an embodiment of the present disclosure provides an apparatus and method for transmitting a reference signal, which can provide a required service to a user who requires different performance and is located in various environments using a new wide system bandwidth (BW) and carrier frequency.

Furthermore, the reference signal proposed by the present disclosure may also be used as a demodulation RS (DMRS) in addition to the aforementioned contents and may be flexibly managed by applying the same method.

A method according to an embodiment of the present disclosure is a method for an eNB to generate a reference signal in a wireless communication system. The method may include receiving user equipment (UE) status information at least one UE, determining a density and pattern of a measured reference signal (MRS) based on the received UE status information and previously stored status information of active UEs, providing information about the determined density and pattern of the MRS to at least one active UE within the coverage area of the eNB, transmitting the MRS in a predetermined period based on the determined density and pattern, and transmitting the MRS based on the determined density and pattern and data to be provided to the at least one active UE.

An apparatus according to an embodiment of the present disclosure is an eNB apparatus for generating a reference signal. The eNB apparatus may include a wireless signal processor configured to convert UE status information received from at least one UE into a signal of a baseband, perform band up-conversion and amplification using transmission power on subframes including a measured reference signal (MRS), and output the signal, a data processor configured to convert the UE status information into a digital signal, output the digital signal, determine a density and pattern of the MRS, and output the determined density and pattern, memory configured to store UE status information of active UEs, and a controller configured to control the density and pattern of the MRS to be determined based on the received UE status information and the status information of the active UEs stored in the memory, control information about the determined density and pattern of the MRS to be provided to at least one active UE within an eNB, control the MRS to be transmitted in a predetermined period based on the determined density and pattern, and control the MRS based on the determined density and pattern and data to be provided to the at least one active UE to be transmitted.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 9A to 9C are diagrams for illustrating the transmission band of a reference signal according to an embodiment of the present disclosure.

DETAILED DESCRIPTION

Figure 1:
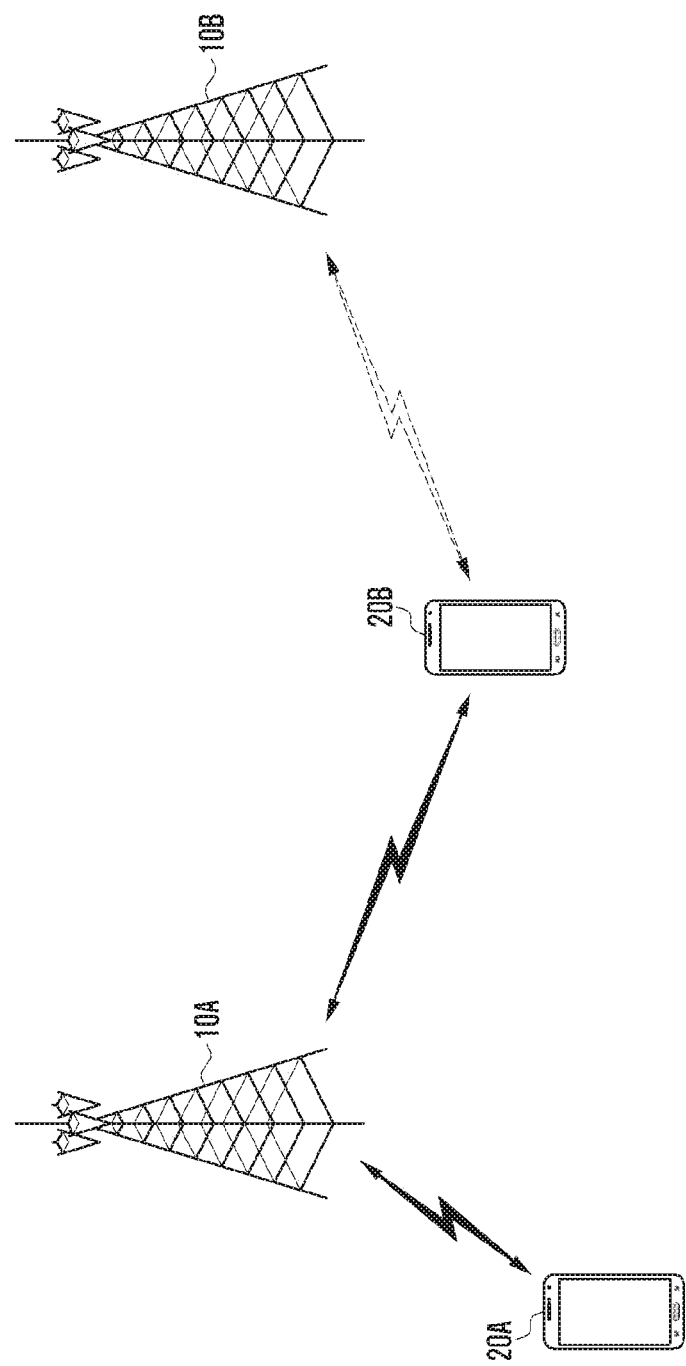
FIG. 1 is a conceptual diagram for illustrating a case where eNBs and UEs perform communication in a wireless communication system to which the present disclosure may be applied.

FIGS. 1 through 14E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments are described in detail with reference to the accompanying drawings. It is to be noted that the same reference numerals are used throughout the drawings to refer to the same elements. Furthermore, it is to be noted that the accompanying drawings of the present disclosure are provided to help understanding of the present disclosure and the present disclosure is not limited to a form or arrangement illustrated in the drawings of the present disclosure. Furthermore, a detailed description of the known functions or elements that may make the gist of the present disclosure vague is omitted. It is to be noted that in the following description, only parts necessary to understand operations according to various embodiments of the present disclosure are described and a description of other parts is omitted in order to prevent the gist of the present disclosure from becoming vague.

In various embodiments of the present disclosure to be described hereunder, a method and apparatus for transmitting a reference signal, which will be applied to a new wireless communication system, are described below. The new wireless communication system to be described hereunder can facilitate the support of new services which may be generated after a specific Spec. task in order to support forward compatibility.

FIG. 1 is a conceptual diagram for illustrating a case where eNBs and UEs perform communication in a wireless communication system to which the present disclosure may be applied.

Referring to FIG. 1, a first eNB 10A and a second eNB 10B are illustrated. A first UE 20A and a second UE 20B performing communication within the first eNB 10A are illustrated. The eNBs 10A and 10B described hereunder according to an embodiment of the present disclosure are described using the term "eNB" used in the LTE-A system, for convenience sake. Furthermore, the UEs 20A and 20B described hereunder according to an embodiment of the present disclosure are described using the term "UE" used in the LTE-A system, for convenience sake. In this case, the UE may require the support of different types of services. For example, the UE1 20A, that is, the first UE, may require the supply of an enhanced mobile broadband (eMBB) service, and the UE2 20B that is, the second UE, may require the supply of an ultra-reliable and low-latency communications (URLLC) service. Furthermore, the first eNB 10A communicating with the UEs 20A and 20B transmits a reference signal (hereinafter referred to as an "RS") for the UEs to perform automatic gain control (AGC), time/frequency/phase offset estimation, a Doppler shift and mobility estimation in their reception process. Accordingly, the RS described in an embodiment of the present disclosure may be operated to configure the density of time/frequency domains and a transmission bandwidth by taking into consideration UE mobility, frequency selectivity, UE capability and a vertical service. This is described in detail later with reference to the accompanying drawings.

Figure 2A:
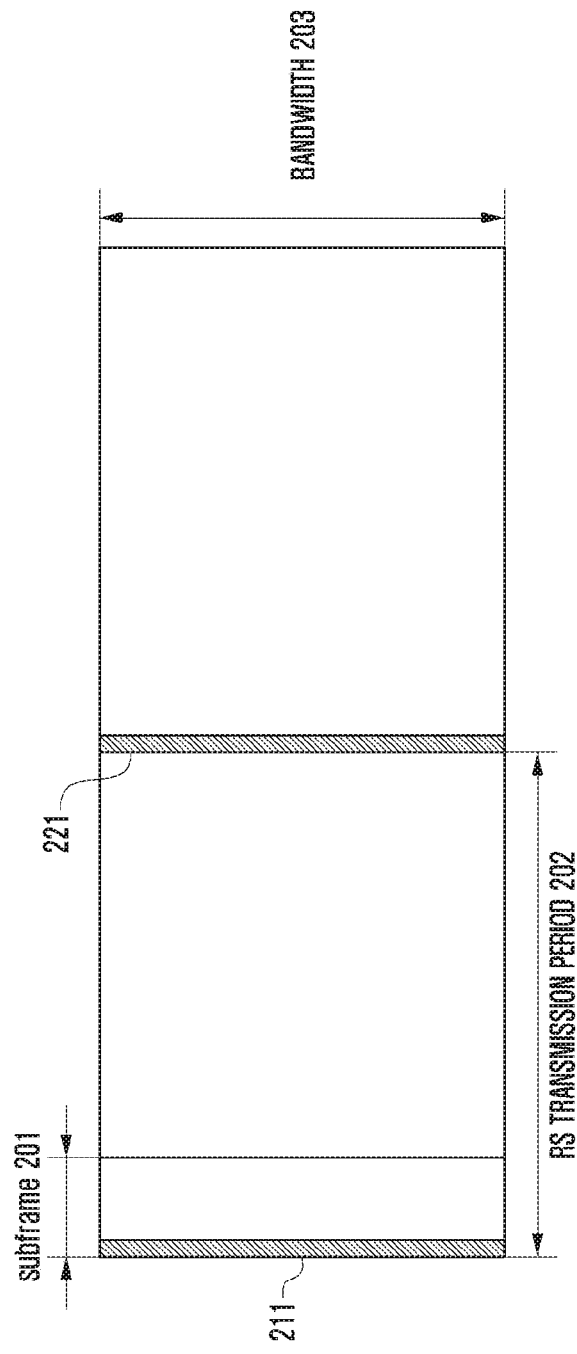
FIGS. 2A and 2B are diagrams for illustrating a configurable reference signal according to each embodiment of the present disclosure.
Figure 2B:
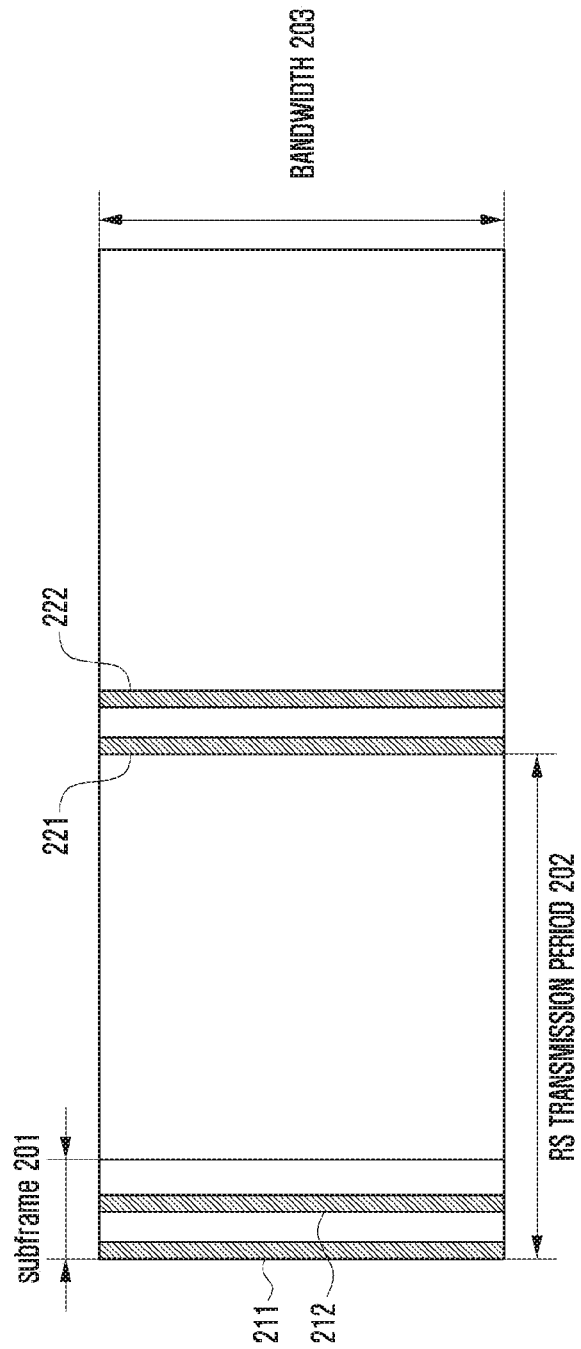

FIGS. 2A and 2B are diagrams for illustrating a configurable RS according to each embodiment of the present disclosure.

First, the configurable RS according to an embodiment of the present disclosure is described with reference to FIG. 2A. In a partial or full bandwidth 203 used in a wireless communication system, one symbol 211 including an RS may be transmitted for each predetermined RS transmission period 202. In the following description, one symbol 211 is assumed to be an orthogonal frequency division multiplexing (OFDM) symbol. One OFDM symbol may include one or more RSs. Furthermore, one subframe 201 may include a plurality of two or more symbols. In general, in wireless communication systems, an RS is transmitted in the first symbol 211 within the subframe 201 as described above. The deployment of RS according to the configuration of FIG. 2A is described in more detail with reference to the drawing to be described later.

A configurable RS according to an embodiment of the present disclosure is described below with reference to FIG. 2B. In a partial or full bandwidth 203 used in a wireless communication system, two different symbols 211 and 212 including RSs may be transmitted for each predetermined RS transmission period 202. In FIG. 2B, unlike in FIG. 2A, an example in which the OMNI symbols 211 and 212 including two different RSs within one subframe 201 are transmitted has been assumed. Even in this case, one RS is transmitted in the first symbol 211 within the subframe 201. The OFDM symbol including the other RS may be spaced from one RS by a specific symbol number and transmitted. In this case, the symbols 211 and 212 including the two different RSs may be transmitted consecutively or may be disposed at an interval of one or more symbols. The deployment of RSs according to the configuration of FIG. 2B is described in more detail with reference to the drawing to be describe later.

In the configurations of FIGS. 2A and 2B, the RS according to an embodiment of the present disclosure is referred to as a "measurement RS (MRS)" in the following description. The RS having the configurations of FIGS. 2A and 2B according to an embodiment of the present disclosure is described compared to a CRS transmitted in the existing LTE system. An MRS according to an embodiment of the present disclosure is not transmitted in all of subframes/transmission time intervals (TTIs), but the pattern of a transmitted RS may be differently configured depending on the current channel state, service type and/or UE capacity of an active user within a cell. For example, if a UE can perform a function that should be performed in a UE receiver, such as a frequency offset or automatic gain control (AGC), using another signal, for example, a primary synchronization signal/secondary synchronization signal (PSS/SSS) or a cyclic prefix symbol (CP) without using an RS, the UE may not transmit an MRS according to an embodiment of the present disclosure. In contrast, if a UE cannot perform a function that should be performed in the reception stage of the UE using another signal, it may transmit an MRS. Even in this case, as in FIG. 2A, only one symbol 211 including an RS may be configured to be transmitted. If it is difficult to estimate a frequency offset through the transmission of only one symbol 211 including an RS along with another signal, two different symbols 211 and 212 including RSs as in FIG. 2B may be transmitted.

The case of FIG. 2A in which only one OFDM symbol 211 including an RS is transmitted may correspond to a case where there is no problem in frequency offset estimation, but AGC or the estimation of a time offset is difficult.

That is, in an embodiment of the present disclosure, the transmission pattern of an MRS to be transmitted may be differently configured depending on the form of an RS necessary for estimation in a UE, that is, the reception side, or a current channel state. In criteria for the operation of a configurable MRS according to an embodiment of the present disclosure, UE mobility, frequency selectivity, UE capability and supported vertical service may be taken into consideration. In an embodiment of the present disclosure, if an MRS is managed to have different tune/frequency domain densities depending on UE mobility and frequency selectivity and only UEs supporting a specific UE capability, for example, a specific bandwidth are activated, the MRS may be transmitted only in a band corresponding to the UE capability range in each RS transmission period 202. A symbol including an RS may not be transmitted in a full band, but the RS may be transmitted only in a configured band depending on UE capability. Furthermore, an MRS may be managed to have a different transmission procedure depending on a currently supported vertical service.

Figure 3:
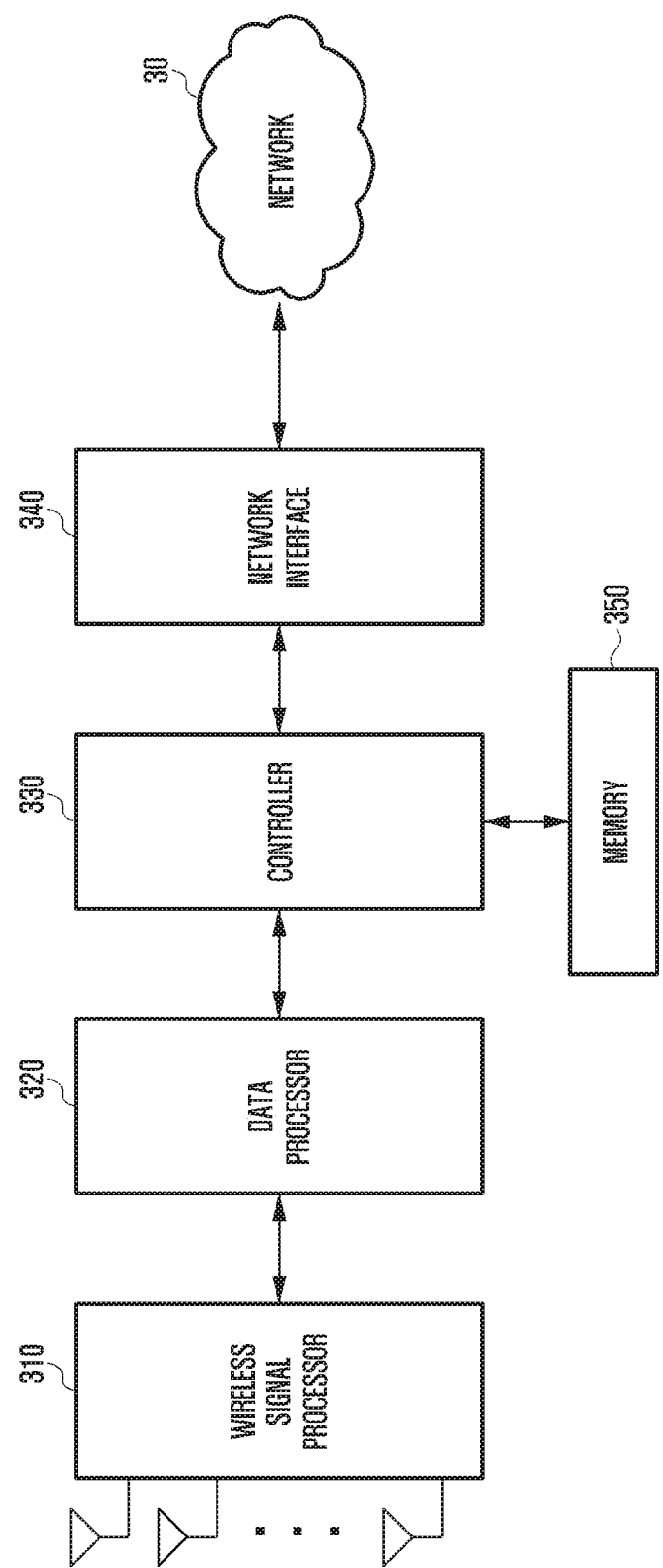
FIG. 3 is a functional internal block diagram illustrating an eNB to which the present disclosure is applied.

FIG. 3 is a functional internal block diagram of an eNB to which the present disclosure is applied.

The functional operation of the eNB according to an embodiment of the present disclosure is described below with reference to FIG. 3. Referring to FIG. 3, the eNB includes a wireless signal processor 310, a data processor 320, a controller 330, a network interface 340 and memory 350. The wireless signal processor 310 may perform the transmission/reception of signals with UEs located within coverage of the eNB through a plurality of antennas. The wireless signal processor 310 may up-convert and power-amplify a signal to be transmitted into a frequency band operating in a system, and may transmit the signal to the UEs through one or two or more antennas. Furthermore, the wireless signal processor 310 performs low-noise amplification on a signal received through an antenna, down-converts the band of the signal into a signal of a baseband, and outputs the signal. The wireless signal processor 310 may be configured using one chip or one board or may be configured using a plurality of chips or a plurality of boards. Furthermore, the wireless signal processor 310 may be configured in the form of one or a plurality of racks depending on the transmission distance and processing capacity of the eNB.

The data processor 320 may encode and modulate data to be transmitted, may map an RS according to an embodiment of the present disclosure to a location along with the data or separately from the data, and may output the data to the wireless signal processor 310. Furthermore, the data processor 320 may demodulate and decode a signal of a baseband received from the wireless signal processor 310 and provide the signal to the controller 330. Furthermore, the data processor 320 may be configured using one chip or one board or may be configured using a plurality of chips or a plurality of boards. Furthermore, the data processor 320 may be configured in the form of one or a plurality of racks depending on the transmission distance and processing capacity of the eNB.

The controller 330 performs overall control on the eNB, and may perform scheduling in addition to control of the transmission of data and the transmission of an RS according to an embodiment of the present disclosure. Furthermore, the controller 330 may perform control for providing data to a specific node present in another eNB or in an upper stage, information about the state of the eNB or information of a UE. Control for transmitting an RS according to an embodiment of the present disclosure in the controller 330 is described in more detail with reference to drawings to be described later. The controller 330 may be configured using one processor or a plurality of processors.

The network interface 340 provides an interface for communicating with the higher network 30, and may convert a transmitted and received data or signals according to a communication standard with a corresponding node. The network interface 340 may have only one interface or may be configured using a board that performs a plurality of interfaces depending on the number and type of networks connected thereto.

The memory 350 includes a region in which data used for control of the eNB is stored or data generated upon control is stored, and may store program data for providing an RS according to an embodiment of the present disclosure. The memory 350 may be integrated with the controller 330 or configured as separate memory depending on a configuration of the eNB.

It is to be noted that the block diagram of the eNB of FIG. 3 illustrated in the present disclosure has no specific limit in terms of such a figurative aspect and is a block diagram only in terms of a functional aspect.

Figure 4:
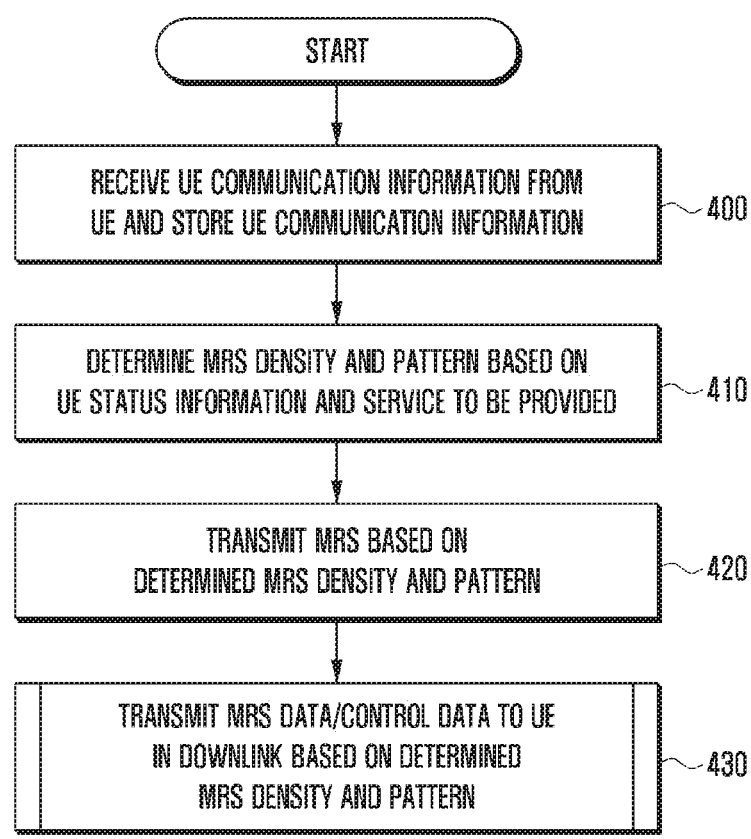
FIG. 4 illustrates a control flowchart when a configurable MRS in which UE status information is taken into consideration is transmitted according to an embodiment of the present disclosure.

FIG. 4 is a control flowchart when a configurable MRS in which UE status information is taken into consideration is transmitted according to an embodiment of the present disclosure.

Referring to FIG. 4, at operation 400, the controller 330 of the eNB may receive UE status information from a specific UE located in the cell (i.e., the coverage area) of the eNB through the wireless signal processor 310 and the data processor 320. In this case, the "UE status information" includes UE capability information and may further include at least one of UE mobility and frequency selectivity. Furthermore, the UE status information may include only UE capability information First, a case where the UE status information includes only UE capability information is described below. The eNB may receive UE capability information from a UE that has entered its communication region. The UE capability information may include bandwidth information that may be received by the UE in addition to the UE capability information.

When the UE capability information is received as described above, at operation 410, the controller 330 may determine an MRS density and pattern based on the received UE status information. A case where the status information includes only UE capability information has been assumed as described above, and thus the case is described below. Furthermore, one UE has been illustrated in FIG. 4. If the present disclosure is applied to an actual system, however, UE status information received at least from the UE and previously stored UE status information of active UEs may be used together. For example, there may be a case where UEs can perform the transmission/reception of data only in a partial bandwidth that belongs to a full bandwidth capable of being provided by a system and that may be available as a result of check based on UE status information of UEs located within the coverage area of the eNB. Although the UEs can perform the transmission/reception of data only in the partial band as described above, if the eNB enables an RS to be transmitted in the full band, resources may be wasted. In an embodiment of the present disclosure, at operation 410, the density and pattern of an MRS are determined based on the UE status information and a service to be provided.

In the case of FIGS. 2A and 2B, determining the density and pattern of an MRS may include determining which one of the case of FIG. 2A and the case of FIG. 2B will be selected. Furthermore, various densities and patterns are described in more detail with reference to the drawings to be described later. As described above, the eNB may configure a band in which an RS is transmitted based on UE status information received from each UE. Furthermore, the eNB may determine the density and pattern of the MRS based on the UE capability information.

Thereafter, at operation 420, the controller 330 may transmit the MRS based on the determined MRS density and pattern. The reception of control data or user data can be smoothly performed by UEs to which the MRS is to be subsequently transmitted. Accordingly, at operation 420, the controller 330 may control the MRS to be transmitted based on the density and pattern of the MRS determined at operation 410. Accordingly, the data processor 320 and the wireless signal processor 310 may transmit the MRS based on the determined MRS density and pattern in a corresponding band under the control of the controller 330.

Thereafter, when the controller 330 proceeds to operation 430, it may transmit data to be served to a user and control data in the downlink (DL). As described above, in the downlink, the MRS based on the density and pattern of the MRS determined at operation 410 and the user data are transmitted together.

In general, although a UE receives a signal of the same quality, it may succeed in decoding a required signal or fail in the decoding depending on performance of a receiver. Accordingly, there may be a case where it is necessary to request an MRS of higher density in order to accurately receive a signal although RS overhead is sacrificed. Furthermore, likewise, it is to be noted that if AGC is performed using an RS of the same density, a required RS density may be different depending on that a performance margin is designed to a degree at the back stage of an automatic control controller.

A case where both UE mobility and frequency selectivity in addition to UE capability information are included is described below. At operation 400, the controller 330 of the eNB obtains UE status information from all of UEs in the active mode. Accordingly, as described above, the UE status information may be information including all of UE capability information, UE mobility and frequency selectivity. The pieces of information may be included in different messages and transmitted or may be included in a single message and transmitted. Furthermore, in an embodiment of the present disclosure, not how the corresponding information will be obtained, but a control procedure after the corresponding information is obtained is important. Accordingly, a method of obtaining the corresponding information is not limited.

Thereafter, at operation 410, the controller 330 may determine the density and pattern of an MRS based on the UE status information received from all of the active UEs and the type of service to be provided to all of the active UEs. The density and pattern of an MRS is described in more detail with reference to drawings to be described later.

For example, brief reference is made to the configuration of FIG. 1. If the communication band of the first UE 20A is a partial band of a lower portion of a full band capable of being provided by a system, the communication band of the second UE 20B is a partial band of an upper portion of the full band capable of being provided by the system, and the bands used by the first UE 20A and the second UE 20B are greatly spaced apart from each other, a band in which any UE does not perform the transmission/reception of data may be present between the two portions. As described above, the band in which any UE does not perform the transmission/ reception of data may have various forms. Furthermore, the type of service required by each UE may be different. In addition, the UEs 20A and 20B may have different UE capability information. Furthermore, the requirements of the UEs 20A and 20B for UE mobility and frequency selectivity may be different. At operation 410, the controller 330 selects the best MRS pattern capable of satisfying such information.

The controller 330 proceeds to operation 420, and may transmit an MRS based on the determined MRS density and pattern. After the MRS is transmitted, at operation 430, the controller 330 may transmit data/control data to the UE in the downlink based on the determined MRS density.

Figure 5:
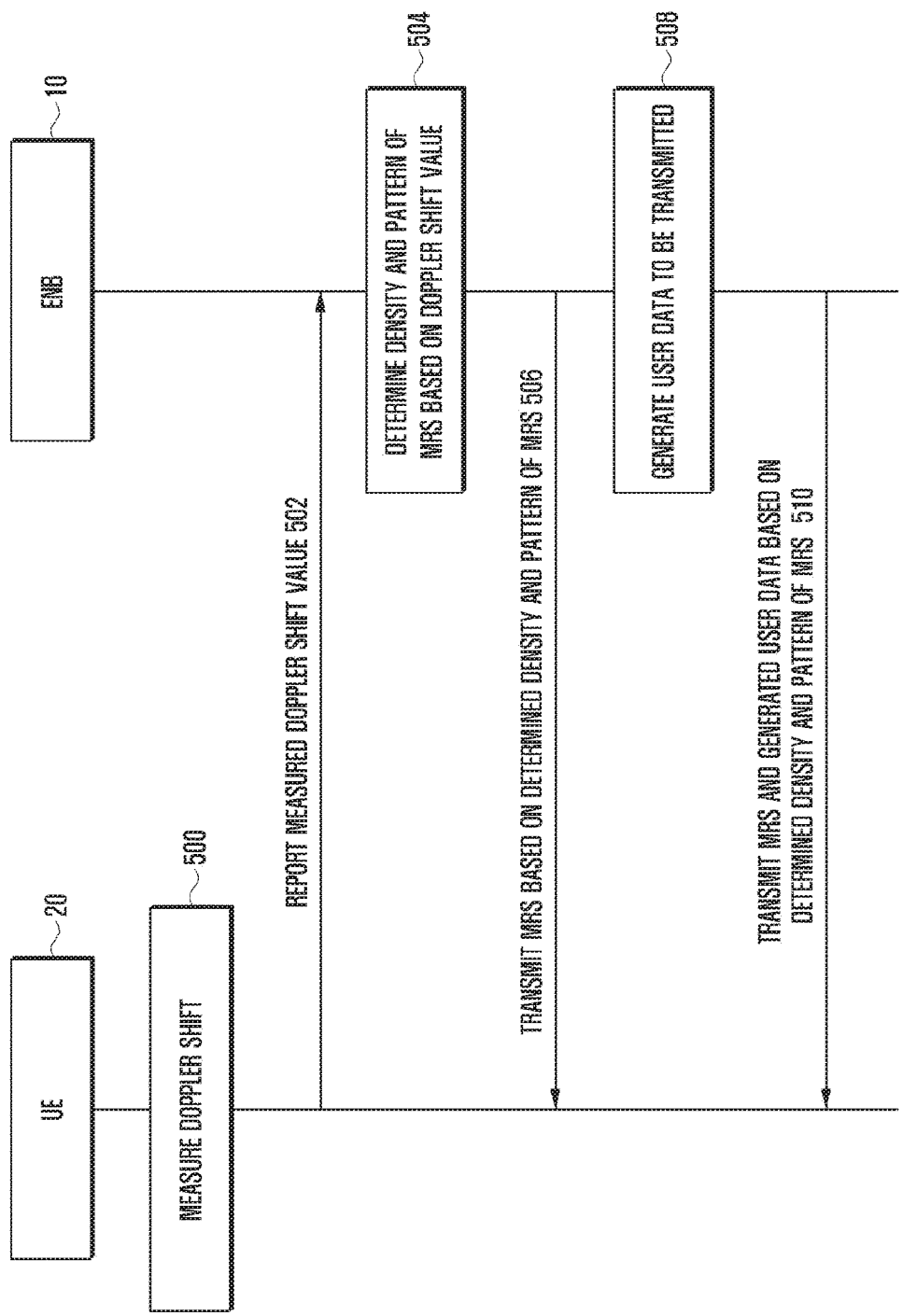
FIG. 5 illustrates a signal flowchart when a configurable MRS in which a Doppler shift is taken into consideration is transmitted according to an embodiment of the present disclosure.

FIG. 5 is a signal flowchart when a configurable MRS in which a Doppler shift is taken into consideration is transmitted according to an embodiment of the present disclosure.

The flowchart of FIG. 5 has been illustrated assuming the case of a Doppler shift, but the same control flowchart may be used in the case of frequency selectivity. Accordingly, in FIG. 5, a case where a Doppler shift value is substituted with frequency selectivity may be identically interpreted. Furthermore, both frequency selectivity and a Doppler shift may be taken into consideration Hereinafter, only a Doppler shift is assumed and described for convenience of description, Frequency selectivity and a Doppler shift are together described at the end of the flowchart of FIG. 5.

Referring to FIG. 5, a UE 20 may be any one of the UEs 20A and 20B illustrated in FIG. 1, and the signal flowchart of FIG. 5 may be performed in each UE. Furthermore, an eNB 10 may be the first eNB 10A or second eNB 10B illustrated in FIG. 1. The eNB may have the same internal configuration as that of FIG. 3.

A Doppler shift is generated based on the Doppler phenomenon of a signal as a user moves. Accordingly, when a user moves at high speed, a greater Doppler shift value may be generated. FIG. 5 is a diagram for illustrating a case where the density of an MRS, that is, an RS transmitted by the eNB, is determined based on a Doppler shift value measured by the UE.

At operation 500, the UE 20 measures a Doppler shift. At operation 502, the UE 20 may feed the measured Doppler shift value back to the eNB. In this case, a feedback message may comply with the format of a message set by a system, but there is no specific limit to a method of transmitting the message.

The eNB 10 receives the Doppler shift value from the UE 20 at operation 502 and proceeds to operation 504, and may determine the density and pattern of an MRS based on the received Doppler shift value. In this case, the density and pattern of the MRS may have the same form as that illustrated in FIGS. 2A and 2B, forms to be described hereinafter, or forms modified from the forms to be described hereinafter.

When the density and pattern of the MRS are determined at operation 504, at operation 506, the eNB 10 may transmit the MRS based on the determined density and pattern of the MRS. Thereafter, at operation 508, the eNB 10 may generate user data to be transmitted. The user data to be transmitted may be data that is received from a network and that is to be transmitted to the UE 20. The coding rate and modulation rate of the data are determined based on various types of information, such as a communication channel environment and/or distance between the UE 20 and the eNB 10 and a service type provided by the eNB. The data may be mapped to a specific location depending on the density and pattern of the MRS.

Thereafter, at operation 510 the eNB may map the MRS according to the MRS density and pattern determined based on the Doppler shift value, may map the MRS to resources in which the user data will be transmitted, and may transmit the resources to the UE 20.

A method for the UE 20 to measure a Doppler shift value as in operation 500 and to transmit the measured Doppler shift value to the eNB 10 as in operation 502 may be divided as follows.

(1) A method for the UE 20 to measure a Doppler shift value in each predetermined period and to feed it to back the eNB 10.

(2) A method for the UE 20 to aperiodically measure a Doppler shift value and to feed it back to the eNB 10.

Accordingly, operation 500 of FIG. 5 may be any one of the two methods. That is, the UE 20 may measure a Doppler shift value in each predetermined period or aperiodically at operation 500, and may feed it back at operation 502.

Furthermore, the case where a Doppler shift value is aperiodically measured may be divided into the following two cases.

(2-1) A method for the eNB 10 to trigger the measurement of a Doppler shift through DL signaling in the case of a specific case (2-2) A method for the UE 20 to measure a Doppler shift in a specific period with a predetermined threshold value and to report the measured Doppler shift through an uplink control/data channel if the measured Doppler shift value is a threshold value or more In the case of the method (2-1), the flowchart of FIG. 5 may further include an operation for the eNB 10 to trigger the measurement of a Doppler shift through DL signaling so that the Doppler shift is measured (not shown in FIG. 5). Accordingly, the UE 20 may measure a Doppler shift value at operation 500 and feed the measured Doppler shift value back to the eNB at operation 502.

Furthermore, in the case of the method (2-2), a configurable MRS may be managed in an on-demand form.

Furthermore, the eNB should notify the UE of the density and pattern of an MRS whenever a change is generated because the density and pattern of the MRS are determined and used. A method for the eNB to notify the UE of the density and pattern of the MRS may include three methods.

The first method is a method for the eNB to provide information about the density and pattern of the MRS to all of UEs within the coverage area of the eNB using a broadcast channel.

The second method is a method for the eNB to transmit information about the density and pattern of the MRS to all of active UEs within the coverage area of the eNB in a unicast manner or to transmit the information to a plurality of active UEs using a multicast channel, wherein UEs in an inactive state perform blind detection.

The third method is a method for the eNB to enable all of UEs to perform blind detection without transmitting special information about the density and pattern of the MRS.

In the blind detection method described in the second and the third methods, energy detection may be performed or detection may be performed based on the correlation scheme of an RS. Furthermore, the second method may be easily applied if the number of active UEs is very small as in a small cell environment.

Measurement reporting for the operation of a configurable MRS is described in more detail below.

First, the method (1), that is, the method for the UE 20 to measure a Doppler shift value in each predetermined period and to feed it back to the eNB 10, is described below.

The UE may periodically measure a Doppler shift or frequency selectivity, and may transmit the results through a measured value or predetermined indication bit to the eNB, In this case, the measured value or indication bit may be transmitted from the UE 20 to the eNB 10 using an uplink control channel or data channel. If an uplink control channel is used and an indication bit of 2 bits is used, the measured value or indication bit may be transmitted from the UE 20 to the eNB 10 as in Table 1.

TABLE 1

| Indication bit | Information contents |
| --- | --- |
| 00 | When an increase of MRS density is not required |
| 01 | When an increase of frequency MRS density is required |
| 10 | When an increase of time MRS density is required |
| 11 | When an increase of time and frequency MRS density increase is required |

As illustrated in Table 1, if the indication bit of 2 bits is used, information about an increase demand and information about a case where an increase is not required may be provided.

In contrast, if the measured value or the indication bit information is transmitted to the eNB using a data channel, the measured Doppler shift/frequency selectivity value may be transmitted as an offset value of an absolute value or specific value. In another method, both the UE 20 and the eNB 10 may be previously configured to have a table for a Doppler shift/frequency selectivity, and the UE may be configured to transmit bits mapped based on the table to the eNB 10. Accordingly, in general, the eNB 10 may increase the density of an MRS based on information requested by the UE 20. However, although an increase of MRS density is requested by the UE 20, the eNB 10 may not change the MRS density by taking into consideration a network environment.

If the method (2), that is, the method for the UE 20 to aperiodically measure a Doppler shift value and to feed it back to the eNB 10, is used, the UE 20 may periodically measure a Doppler shift/frequency selectivity value in response to DL signaling from the eNB 10. Thereafter, the UE 20 may receive a specific threshold value received from the eNB 10 through a specific message, for example, an RRC message, and may store the received threshold value. Accordingly, the UE 20 may compare a Doppler shift/frequency selectivity value with the threshold value whenever the UE periodically measures the Doppler shift/frequency selectivity value. If the measured value is greater than the threshold value, the UE 20 may feed the measured value back to the eNB 10. A case where aperiodical reporting is performed as described above may include two optional methods.

The optional method 1: If the eNB 10 triggers the measurement of a Doppler shift/frequency selectivity value through DL signaling so that the Doppler shift/frequency selectivity value is measured and fed back, the UE 20 may measure a Doppler shift/frequency selectivity value and report it using any one of an uplink control channel or a data channel.

The optional method 2: First, the UE 20 stores a threshold value received from the eNB 10 through a specific message, for example, an RRC message. Thereafter, the UE 20 periodically measures a Doppler shift/frequency selectivity value. If the measured value is greater than the stored threshold value, the UE may transmit a message that requests an increase of MRS density using one of an uplink control channel and a data channel.

Figure 6:
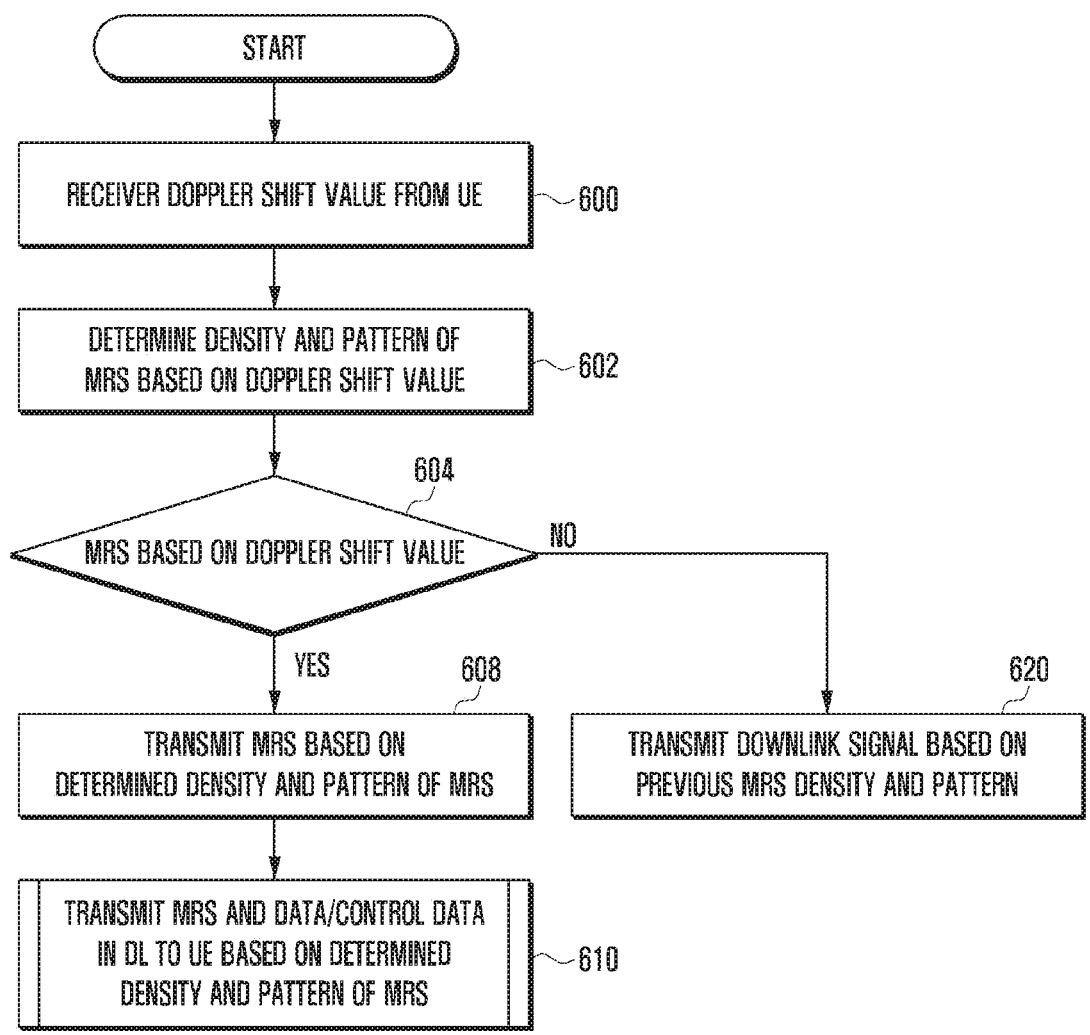
FIG. 6 illustrates a control flowchart when a configurable IRS is transmitted according to another embodiment of the present disclosure.

FIG. 6 is a control flowchart when a configurable MRS is transmitted according to another embodiment of the present disclosure.

The control flowchart of FIG. 6 is for illustrating an operation method of an MRS configurable depending on user mobility. A UE measures the Doppler shift value of a signal received from an eNB and transmits the results of the measurement to the eNB. Accordingly, at operation 600, the controller 330 of the eNB may receive the Doppler shift value from the UE. After receiving the Doppler shift value, the controller 330 of the eNB proceeds to operation 602, and may determine the density and pattern of an MRS based on the Doppler shift value received from the UE. The density and pattern of the MRS may be previously configured based on a Doppler shift value and may have been stored by the eNB and the UE.

After the density and pattern are determined at operation 602, the controller 330 may proceed to operation 604 and check whether the density or/and pattern of a previous MRS have been changed. That is, the controller 330 checks whether the density or/and pattern of the MRS determined at operation 602 is identical with the density or/and pattern of the previous MRS or has been changed. If, as a result of the check at operation 604, it is found that the density or/and pattern of the MRS has been changed, the controller 330 proceeds to operation 608. In contrast, if, as a result of the check at operation 604, it is found that the density or/and pattern of the MRS has not been changed, the controller 330 proceeds to operation 620 and transmits the MRS based on the density and pattern of the previous MRS.

In contrast, if operation 604 proceeds to operation 608, the controller 330 may configure the MRS based on the newly changed MRS density or/and pattern and transmit the MRS. That is, the controller 330 controls the data processor 320 to map the MRS based on the newly changed density or/and pattern of the MRS. The data processor 320 maps the MRS based on the newly changed density or/and pattern of the MRS and provides the MRS to the wireless signal processor 310, Accordingly, the wireless signal processor 310 may transmit a signal including the newly changed density or/and pattern of the MRS by performing band-up and power amplification on the signal.

Thereafter, at operation 610, the controller 30 may transmit the MRS based on the newly changed density or/and pattern of the MRS data and data and control data to be transmitted to the UE through the downlink.

Figure 7A:
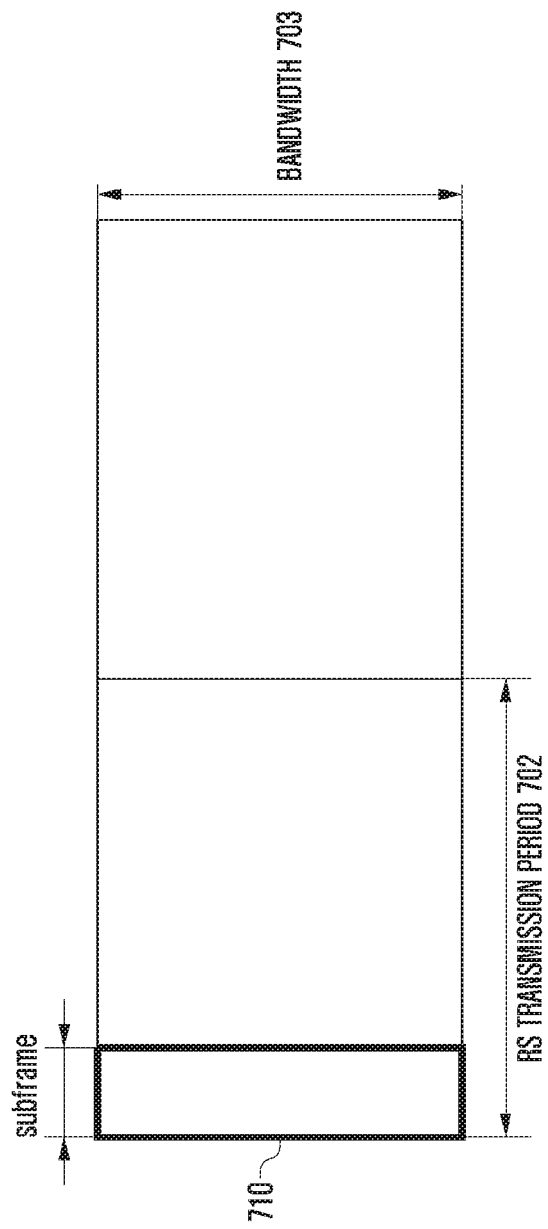
FIGS. 7A to 7C are diagrams illustrating configurable MRS sets according to an embodiment of the present disclosure.
Figure 7B:
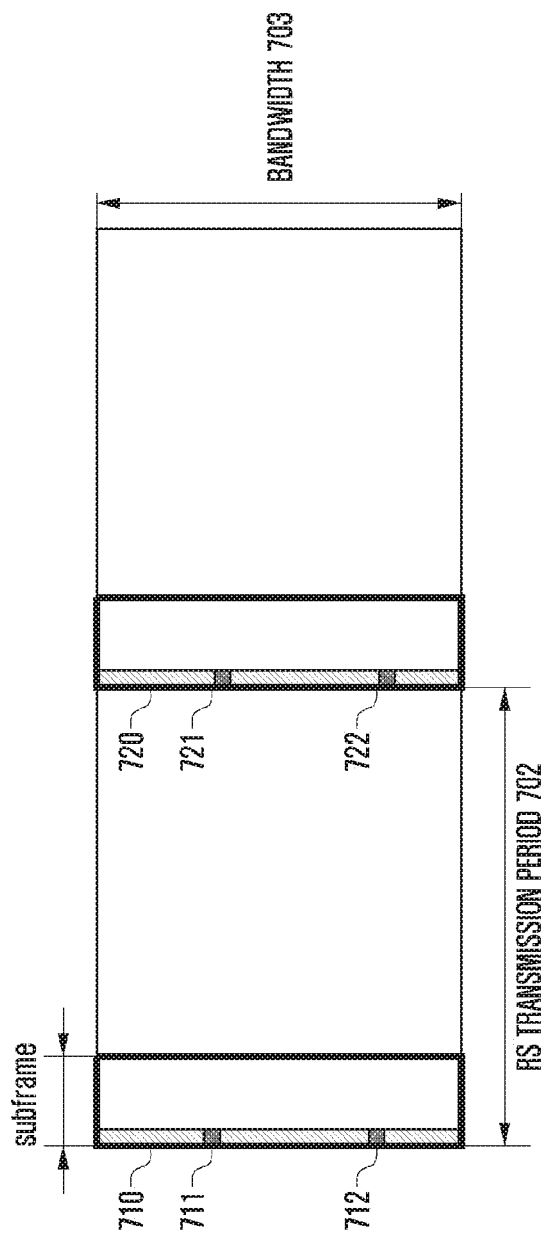
Figure 7C:
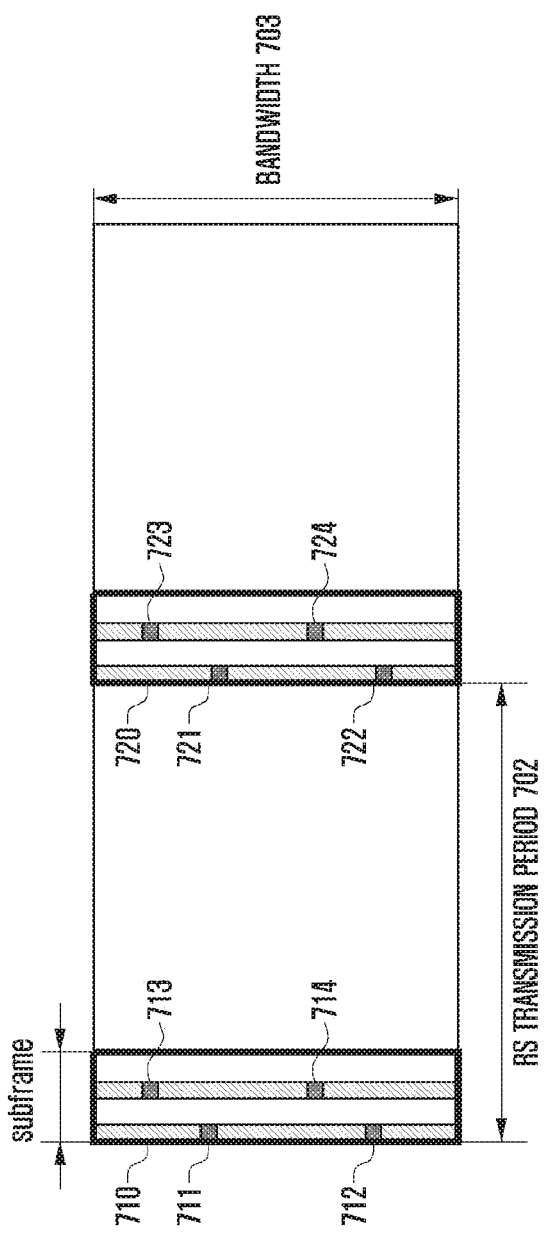

FIGS. 7A to 7C are diagrams illustrating configurable MRS sets according to an embodiment of the present disclosure.

FIG. 7A is a diagram illustrating a case where an MRS is not transmitted according to an embodiment of the present disclosure. In general, a wireless communication system is configured to transmit an RS in the first subframe 710. Furthermore, such RSs have a predetermined RS transmission period 702. An RS may be configured to be not transmitted in the first subframe 710 during the RS transmission period 702 in the region of a full bandwidth 703. In the following description, the form of FIG. 7A is referred to as an "RS non-transmission type."

FIG. 7B shows a form in which an MRS is transmitted in the first subframe 710 in which an RS is transmitted compared to FIG. 7A. In this case, the first subframe 710 may include a plurality of OFDM symbols. FIG. 7B shows a case where RSs 711 and 712 are included only in one symbol within the first subframe 710 in which an RS is transmitted. Furthermore, an RS is periodically repeated and generated, and thus RSs 721 and 722 may be included only in one symbol of the first subframe 720 at which a next period starts. As illustrated in FIG. 7B, a case where an RS is included only in one symbol in a subframe in which an RS is transmitted is referred to as a "1-symbol RS transmission type."

Compared to FIG. 7B, FIG. 7C shows a form in which an MRS is transmitted through two symbols within the first subframe 710 in which an RS is transmitted. In this case, the first subframe 710 may include a plurality of OFDM symbols. FIG. 7C illustrates a case where an MRS is transmitted using the two of a plurality of OFDM symbols. The form of FIG. 7C may be additionally changed. For example, an MRS may be transmitted using three symbols within one subframe, or an MRS may be transmitted using four symbols within one subframe. The form of 7C is described below as an example, for convenience of description.

FIG. 7C shows a case where the RSs 711 and 712 are included in the first symbol of two symbols within the subframe 701 in which an RS is transmitted and RSs 713 and 714 are included in another symbol of the two symbols. In this case, the two symbols may be consecutively disposed or may be spaced apart by a specific symbol number as illustrated in FIG. 7C. In FIG. 7C, the RSs disposed in the two different symbols may be disposed in different frequency bands as illustrated in FIG. 7C.

Furthermore, an RS is periodically repeated and generated. Accordingly, even in the first subframe 720 of a next RS period, OFDM symbols including RSs 721, 722, 723 and 724 may be disposed in two symbols as described above. In FIG. 7C, as in FIG. 7B, the number of RSs included in one symbol has been assumed to have the same form as that of FIG. 7B. A case where RSs are configured to be included in two or more symbols in a subframe in which an RS is transmitted as illustrated in FIG. 7C is referred to as a "plural symbol RS transmission type."

The density and pattern of each of the "RS non-transmission type", "1-symbol RS transmission type" and plural symbol RS transmission type" illustrated in FIGS. 7A to 7C may be changed as described above. Accordingly, a case where the density and pattern are changed is described below with reference to FIGS. 8A to 8N.

Figure 8A:
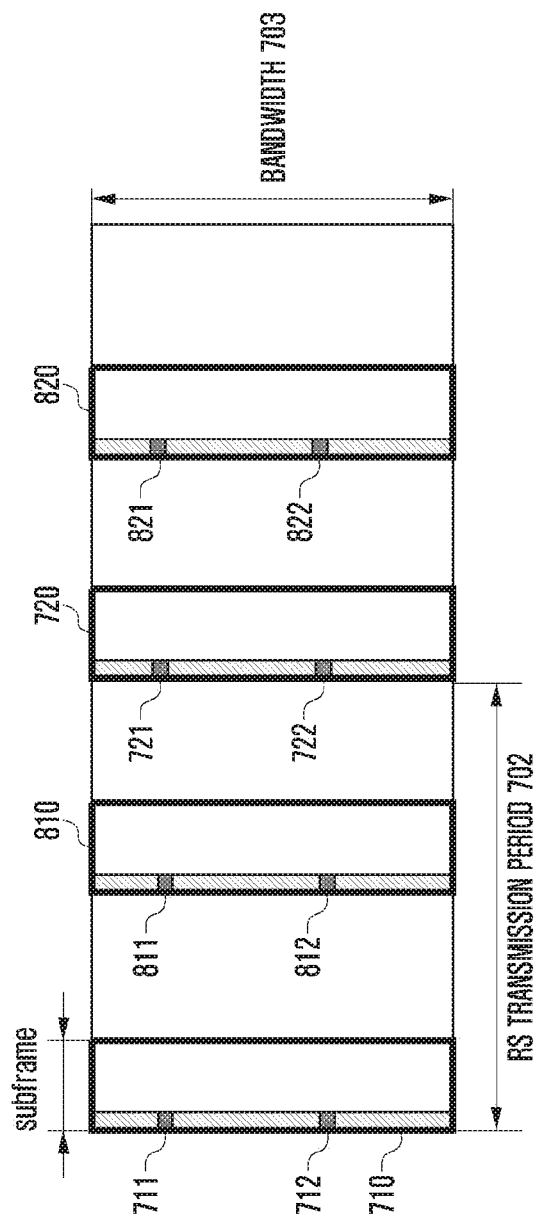
FIGS. 8A-8N are diagrams illustrates examples in which density and pattern of each of "RS non-transmission type", "1-symbol RS transmission type" and plural symbol RS transmission type" illustrated in FIGS. 7A-7C are changed according to various embodiments of the present disclosure.
Figure 8B:
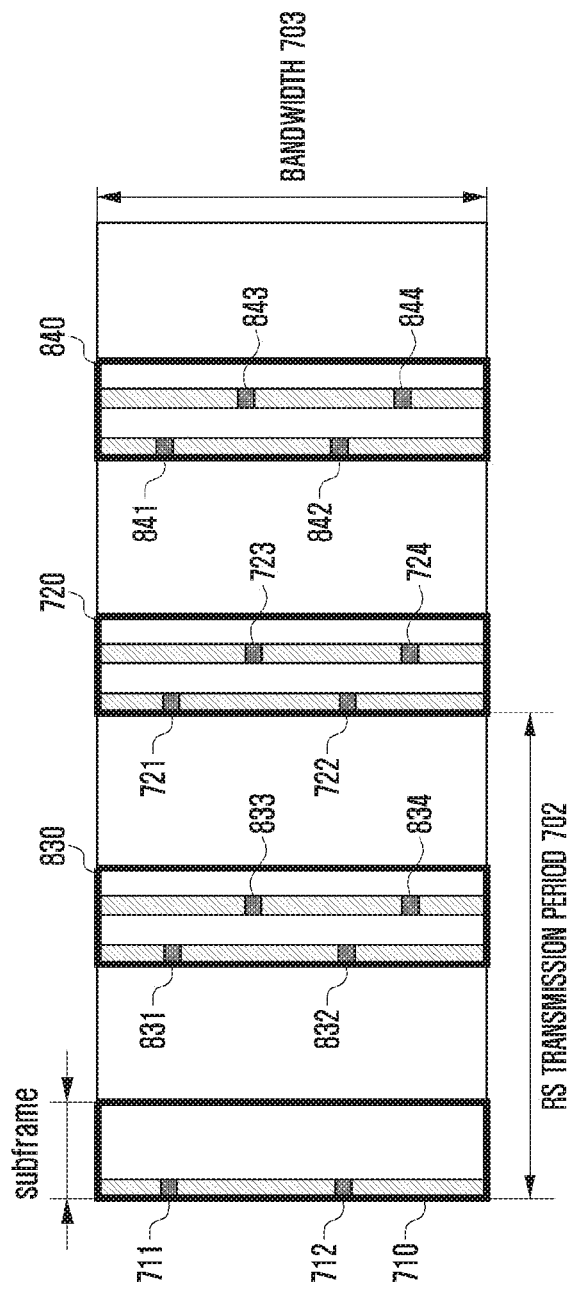

FIGS. 8A and 8B are diagrams showing examples in which an MRS transmission density and pattern are changed according to various embodiments of the present disclosure.

First, FIGS. 8A and 8B are diagrams illustrating cases w density has been increased in the time domain when MRSs of the "1-symbol RS transmission type" and the "plural symbol RS transmission type" are transmitted.

FIG. 8A is an exemplary diagram of a case where density has been increased in the time domain with respect to FIG. 7B and the illustrated 1-symbol RS transmission type. In FIG. 8A, the same reference numerals as those of FIG. 7B have been used so that FIG. 8A is compared with the FIG. 7B.

Accordingly, FIG. 8A is compared with FIG. 7B and described. As described above, in FIG. 8A, an MRS is transmitted in the first subframe 710 in which an RS is transmitted. The first subframe 710 may include a plurality of OFDM symbols, and the RSs 711 and 712 are included in only one symbol within the subframe 710 in which an RS is transmitted. Furthermore, in FIG. 8A, in order to increase RS density in the time domain, a subframe having the same form as the first subframe 710 may be configured in a specific subframe 810 within the same period. That is, as illustrated in FIG. 8A, RSs 811 and 812 are configured to be included in the first symbol of the specific subframe 810 within the same period and may be additionally transmitted.

In a next period, RSs 821 and 822 may be identically configured to be included in a subframe 820 having the same location as the first subframe 720 and the first period and may be additionally transmitted. Various methods may be used with respect to the location of the RSs and are described in more detail with reference to drawings to be described later.

Next, FIG. 8B is a diagram illustrating a case density has been increased in the time domain when an MRS of the plural symbol RS transmission type is transmitted. In FIG. 8B, the same reference numerals as those of FIG. 7C are used so that FIG. 8B is compared with FIG. 7C.

Accordingly, FIG. 8B is compared with FIG. 7C and described. In FIG. 8B, as described above, an MRS is transmitted through an OFDM symbol including two different RSs in the first subframe 710 in which an RS is transmitted. The first subframe 710 may include a plurality of OFDM symbols, and RSs 711, 712 are included in two different OFDM symbols within the subframe 710 in which an RS is transmitted. Furthermore, in FIG. 8B, in order to increase RS density in the time domain, a subframe having the same form as the first subframe 710 may be configured in a specific subframe 830 within the same period. That is, as illustrated in FIG. 8B, RSs 831, 832, 833 and 834 may be configured to be included in the first symbol of the specific subframe 830 within the same period and may be additionally transmitted.

In a next period, RSs 841, 842, 843 and 844 may be identically configured to be included in a subframe 840 having the same location as the first subframe 720 and the first period and may be additionally transmitted. Various methods may be used with respect to the location of the RSs and are described in more detail with reference to drawings to be described later.

Figure 8C:
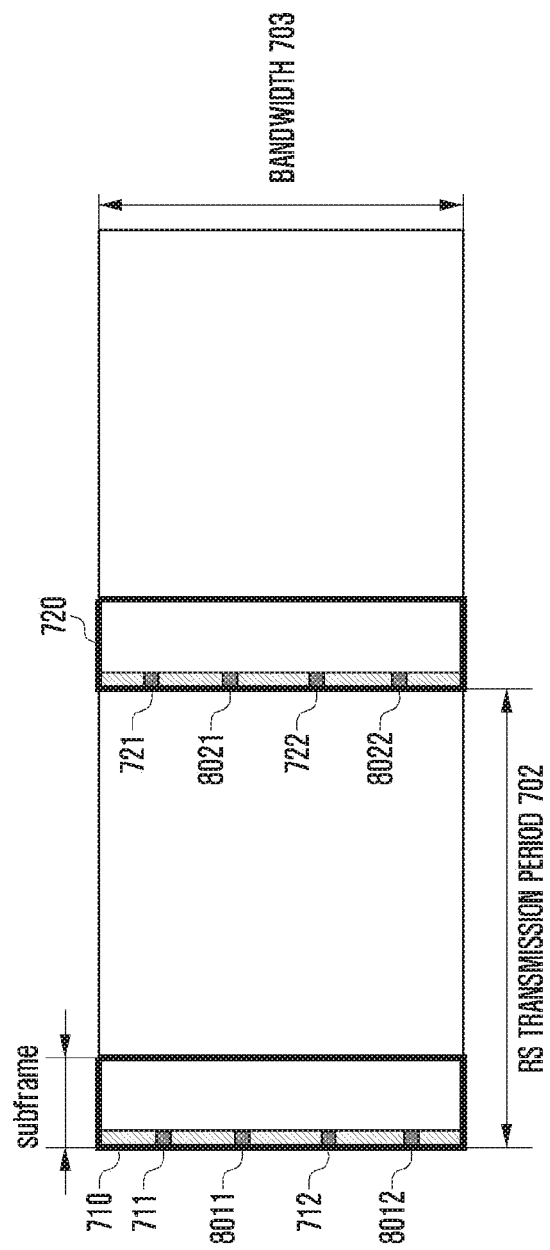
Figure 8D:
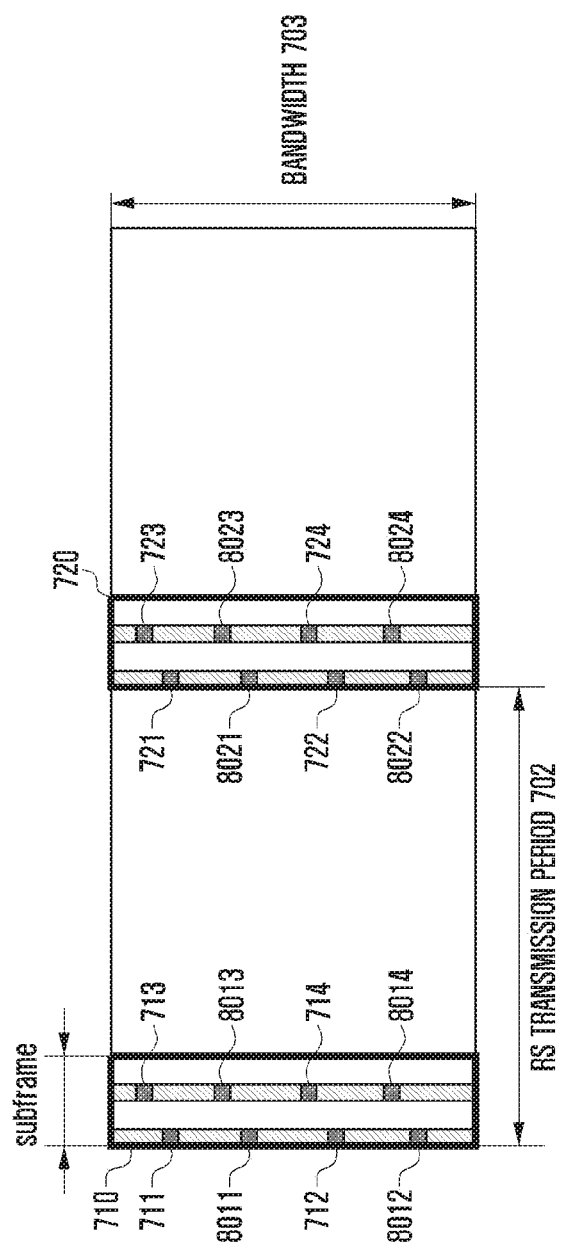

FIGS. 8C and 8D are exemplary diagrams of cases where the density of RSs has been increased in the frequency domain.

FIG. 8C is an exemplary diagram of a case where density has been increased in the frequency domain with respect to the 1-symbol RS transmission type illustrated in FIG. 7B. In FIG. 8C, the same reference numerals as those of FIG. 7B are used so that FIG. 8C is compared with FIG. 7B.

Accordingly, FIG. 8C is compared with FIG. 7B and described. In FIG. 8C, as described above, an MRS is transmitted in the first subframe 710 in which an RS is transmitted. The first subframe 710 may include a plurality of OFDM symbols, and the RSs 711 and 712 have been included in only one symbol within the subframe 710 in which an RS is transmitted. In contrast, in FIG. 8C, added RSs 8011 and 8012 are included in the one OFDM symbol. That is, FIG. 8C may correspond to a case where the density of RSs has been increased in the frequency axis.

In a next period, added RSs 8021 and 8022 may be further included in one OFDM symbol of the first subframe 720 along with the existing RSs 721 and 722.

FIG. 8D is an exemplary diagram of a case where density has been increased in the frequency domain with respect to the plural symbol RS transmission type illustrated in FIG. 7C. In FIG. 8D, the same reference numerals as those of FIG. 7B are used so that FIG. 8D is compared with FIG. 7C.

Accordingly, FIG. 8D is compared with FIG. 7C and described. In FIG. 8D, as described above, an MRS is transmitted in the first subframe 710 in which an RS is transmitted. The first subframe 710 may include a plurality of OFDM symbols, and RSs 711 and 712, 713 and 714 are included in two OFDM symbols within the subframe 710 in which an RS is transmitted. In contrast, in FIG. 8D, RSs 8011, 8012, 8013 and 8014 are further added to the OFDM symbols in which RSs are transmitted. That is, FIG. 8D may correspond to a case where the density of RSs has been increased in the frequency axis.

In a next period, added RSs 8021, 8022, 8023 and 8024 may be further included within OFDM symbols of the first subframe 720 along with the existing RSs 721, 722, 723 and 724.

FIGS. 8E and 8F are diagrams showing cases where MRSs are transmitted based on a UE capability band according to various embodiments of the present disclosure.

First, FIGS. 8E and 8F are diagrams illustrating cases density has been increased in the time domain when MRSs of the "1-symbol RS transmission type" and the "plural symbol RS transmission type" are transmitted.

In FIG. 8E, the same reference numerals as those of FIG. 7B are used. In FIG. 8E, as described above, an MRS is transmitted in the first subframe 710 in which an RS is transmitted. In this case, compared to FIG. 7B, only the RS 711 located in the band of a UE capability bandwidth 803 is transmitted. In a next period, only an RS 721 located in the band of the UE capability bandwidth 803 is transmitted within the first subframe 720. If an RS is transmitted only in a specific band, that is, a bandwidth according to the reception capability of UEs located in an eNB, as described above, there is an effect in that power consumption when the eNB performs transmission can be reduced.

Unlike FIG. 8E, FIG. 8F illustrates the case of the plural symbol RS transmission type. Even in the case of the plural symbol RS transmission type, as described above, an MRS is transmitted through two different symbols in the first subframe 710 in which an RS is transmitted. However, compared to FIG. 7C, only the RSs 711 and 713 located in the band of the UE capability bandwidth 803 are transmitted. In a next period, only the RSs 721 and 723 located in the band of the UE capability bandwidth 803 are transmitted within the first subframe 720. If an RS is transmitted only in a specific band, that is, a bandwidth according to the reception capability of UEs located in an eNB, as described above, there is an effect in that power consumption when the eNB performs transmission can be reduced.

Even in the case where an RS is transmitted only in a partial bandwidth, the density of RSs in the time or/and frequency domains may be changed. First, a case where the density of RSs in the frequency domain is changed is described with reference to FIGS. 8G and 8H.

Figure 8G:
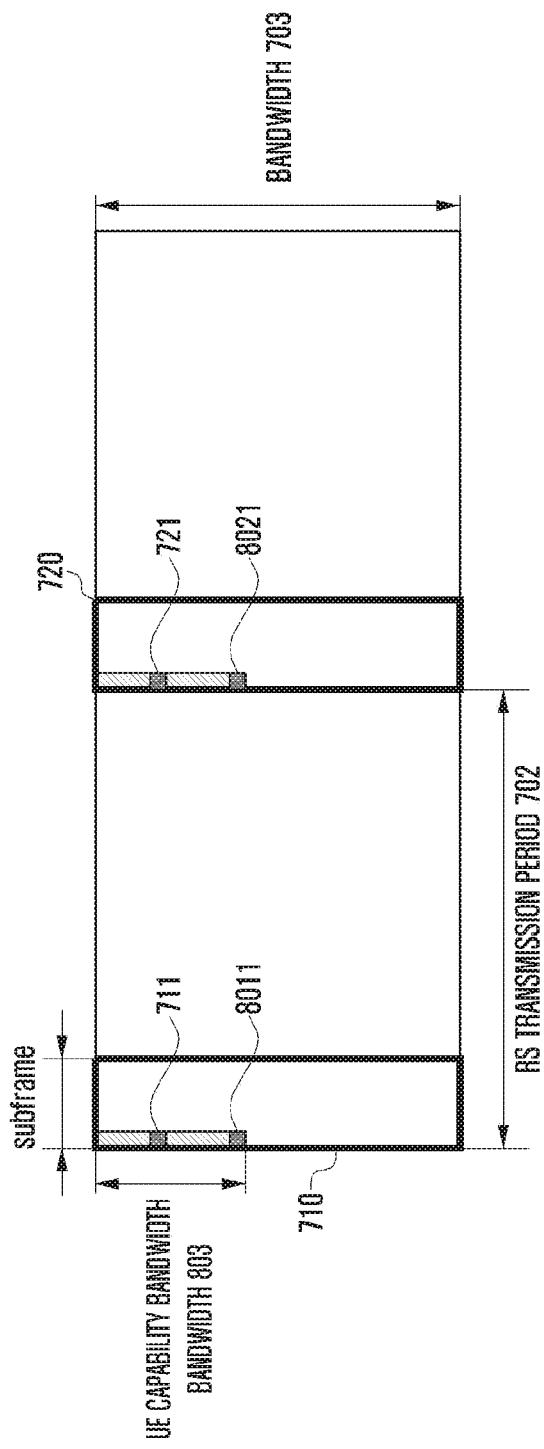

In FIG. 8G, as described above, only an RS located in a partial band, that is, the UE capability bandwidth 803, within the first subframe 710 in which an RS is transmitted is transmitted. In this case, the density of RSs may be increased in the frequency axis as described above. That is, an RS 8011 may be configured to be further included in addition to an RS 711 located in the band of the UE capability bandwidth 803. In a next period, an RS 8021 may be further transmitted in addition to an RS 721 located in the band of the UE capability bandwidth 803 within the first subframe 720. If RSs are transmitted only in a partial bandwidth, that is, a bandwidth according to the reception capability of UEs located in an eNB, as described above, there is an effect in that power consumption can be reduced when the eNB performs transmission.

Unlike FIG. 8G, FIG. 8H illustrates the case of the plural symbol RS transmission type. Even in the case of the plural symbol RS transmission type, as described above, MRSs are transmitted in two different symbols within the first subframe 710 in which an RS is transmitted. Even in this case, RSs 711 and 713 located in the band of the UE capability bandwidth 803 and symbols 8011 and 8013 added to increased density in the frequency domain are transmitted.

In a next period, only RSs 721 and 723 located in the band of the UE capability bandwidth 803 within the first subframe 720 and symbols 8021 and 8023 added to increase density in the frequency domain are transmitted. If RSs are transmitted only in a partial bandwidth, that is, a bandwidth according to the reception capability of UEs located in an eNB, as described above, there is an effect in that power consumption can be reduced when the eNB performs transmission.

Cases where: the density of RSs both in the frequency domain and the time domain is increased are described below with reference to FIGS. 8I and 8J.

Figure 8I:
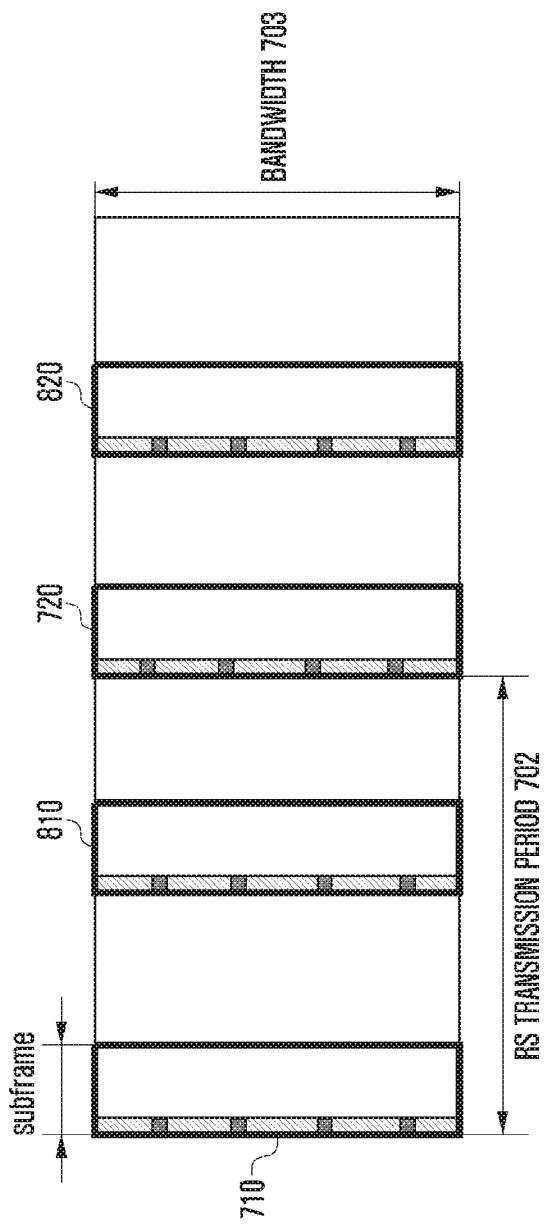

From FIG. 8I, it may be seen that subframes 810 and 820 have been additionally included in respective RS transmission periods compared to FIG. 7B. Furthermore, it may also be seen that the number of RSs included in one symbol within the first subframe 710 of the RS transmission period 702 has been increased compared to the existing case of FIG. 7B, If more RSs are included in one symbol as described above, this means that the number of RSs has been increased in the frequency domain. Accordingly, FIG. 8I may correspond to a case where the density of RSs in the time domain and frequency domain has been increased in the 1-symbol RS transmission type.

Next, from FIG. 8J, it may be seen that subframes 830 and 840 have been additionally included in respective RS transmission periods compared to FIG. 7C. Furthermore, it may also be seen that the number of RSs included in one symbol within the first subframe 710 of the RS transmission period 702 has been increased compared to the existing case of FIG. 7C. If more RSs are included in one symbol as described above, this means that the number of RSs has been increased in the frequency domain. Accordingly, FIG. 8I may correspond to a case where the density of RSs in the time domain and frequency domain has been increased in the plural symbol RS transmission type.

Figure 8L:
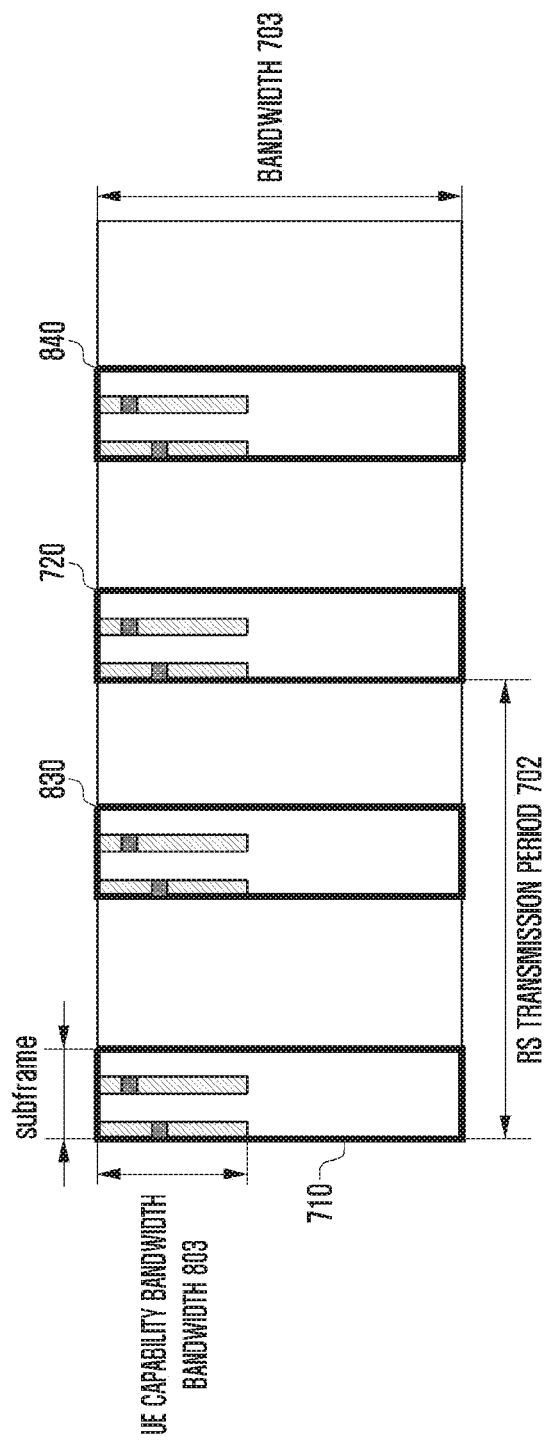

FIGS. 8K and 8L are diagrams illustrating cases where RSs are increased in the time domain if the RSs are transmitted only in a partial band.

Referring to FIG. 8K, only an RS located in a partial band, that is, the UE capability bandwidth 803, in the first subframe 710 in which an RS is transmitted is transmitted. In this case, the density of RSs in the time domain may be increased as described above. That is, in addition to the first subframes 710 and 720 of RS transmission periods, other subframes 810 and 820 in which RSs are transmitted may be added within the RS transmission periods and transmitted. If subframes are added in the time domain as described above, density in the time domain can be increased.

In contrast, FIG. 8L illustrates the case of the plural symbol RS transmission type. Only RSs are transmitted in a partial band within the first subframe 710 in which an RS is transmitted, that is, in two different symbols located in the UE capability bandwidth 803. In this case, the density of RSs may be increased in the time domain as described above. That is, in addition to the first subframes 710 and 720 of RS transmission periods, other subframes 830 and 840 in which RSs are transmitted may be added within the RS transmission periods and transmitted. If subframes are added in the time domain as described above, density in the time domain can be increased.

Figure 8M:
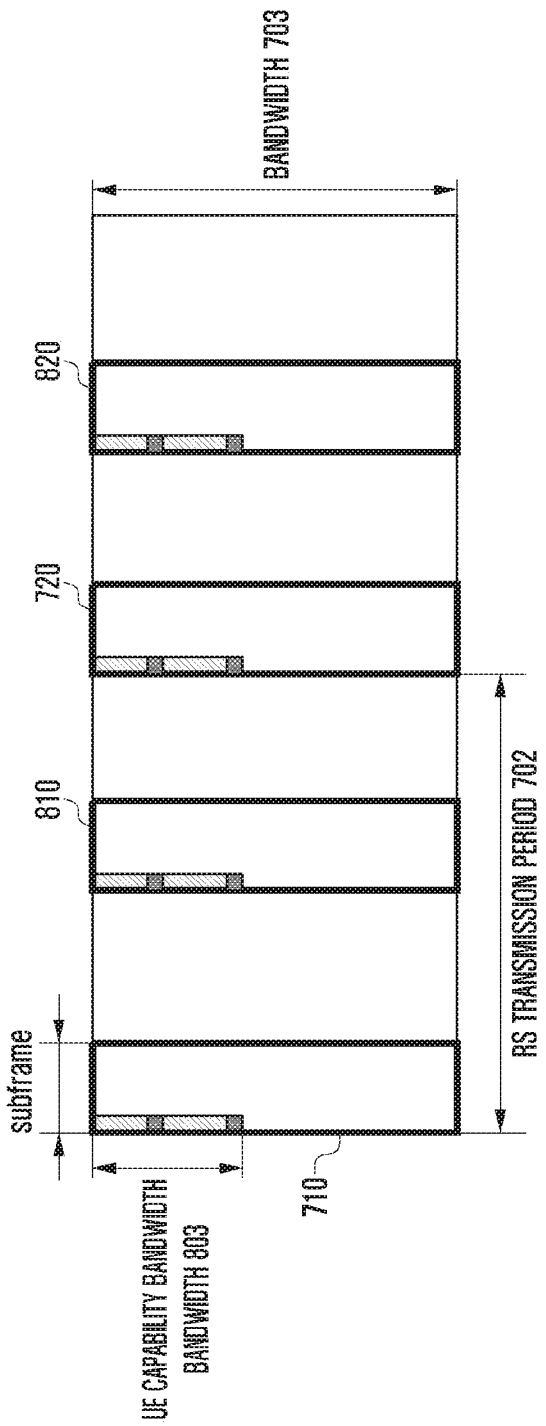
Figure 8N:
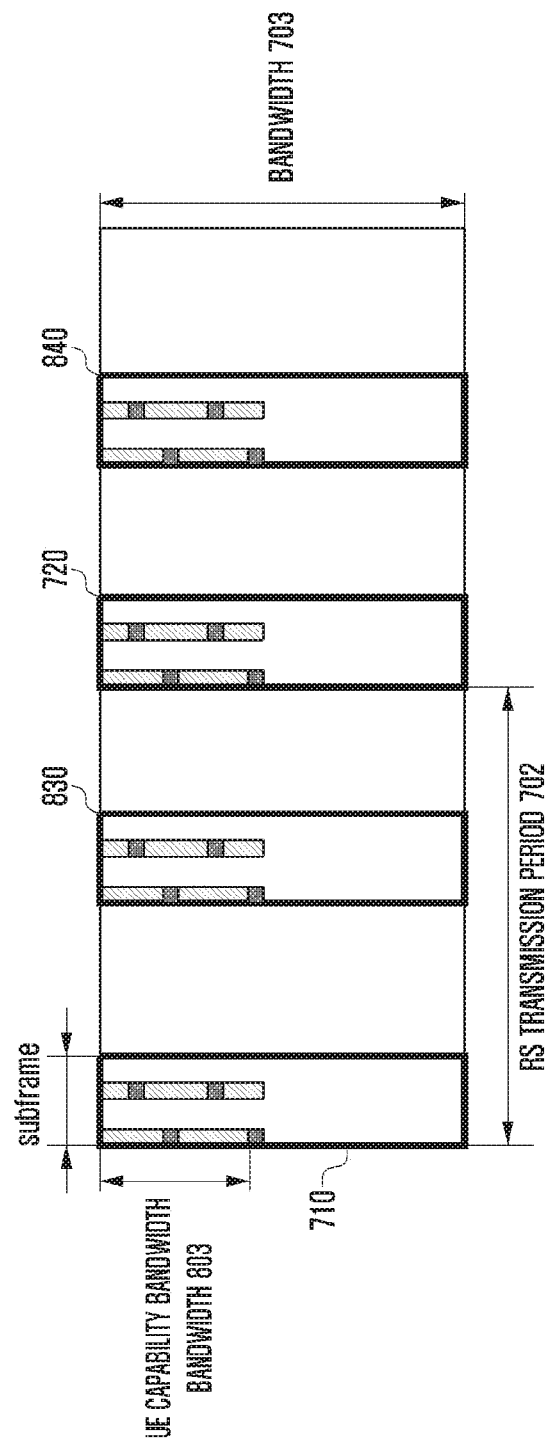

FIGS. 8M and 8N are diagrams illustrating cases where RS density is increased only in a partial UE capability bandwidth in the time domain and frequency domain.

Referring to FIG. 8M, RSs located in a partial band, that is, the UE capability bandwidth 803, within the first subframe 710 in which an RS is transmitted are transmitted. In this case, the density of RSs may be increased in the time domain as described above. That is, in addition to the first subframes 710 and 720 of RS transmission periods, other subframes 810 and 820 in which RSs are transmitted may be added within the RS transmission periods and transmitted. If subframes are added in the time domain as described above, density in the time domain can be increased. Furthermore, the number of RSs included in each subframe and transmitted in one symbol has been increased compared to FIG. 8E. Accordingly, FIG. 8M corresponds to a case where RSs are increased both in the time domain and the frequency domain and transmitted.

In contrast, FIG. 8L illustrates the case of the plural symbol RS transmission type. Only RSs are transmitted in a partial band, that is, two different symbols located in the UE capability bandwidth 803, within the first subframe 710 in which RSs are transmitted. In this case, the density of RSs in the time domain may be increased as described above. That is, in addition to the first subframes 710 and 720 of RS transmission periods, other subframes 830 and 840 in which RSs are transmitted are added within the RS transmission periods and transmitted. If subframes are added in the time domain as described above, density in the time domain can be increased. Furthermore, the number of RSs included in each subframe and transmitted in one symbol has been increased compared to FIG. 8F. Accordingly, FIG. 8L corresponds to a case where RSs are increased both in the time domain and the frequency domain and transmitted.

The sharing of information, such as the "RS non-transmission type", "1-symbol RS transmission type" and "plural symbol RS transmission type" illustrated in FIGS. 7A to 7C and FIGS. 8A to 8N, that is, modified examples thereof, are described below. Information about each of the aforementioned types should be shared between an eNB and a UE. Accordingly, when an eNB transmits type information configured for the transmission of an MRS to a UE, the UE can precisely detects the MRS. Methods for an eNB to provide type information to a UE are described.

First, a method for an eNB to provide type information to a UE may basically include two methods. The first method may be a method using physical layer signaling, for example, downlink control information (DCI). Although DCI is used, it may be transmitted in various forms. In an embodiment of the present disclosure, two cases are described.

First, a case where the type of MRS is indicated using information of 4 bits is described below. If the type of MRS is indicated using 4 bits, information of "0000" ~"1111" may be used. Accordingly, information from the location of the MSB of each bit to the location of the LSB may be defined as follows.

The first bit may be set to determine whether the type is the "1-symbol RS transmission type" or the "plural symbol RS transmission type." The second bit may be set to indicate whether density will be increased in the time domain. The third bit may be set to indicate whether density will be increased in the frequency domain. The last fourth bit may be set to determine whether a type will be set depending on a UE capability bandwidth. If the classification according to the UE capability bandwidth is not used, the type of MRS may be indicated using only the three bits.

The "RS non-transmission type" illustrated in FIG. 7A corresponds to a case not illustrated in the above examples. However, in the RS non-transmission type, a UE may detect the type through blind detection using an energy detection method and RS correlation. Furthermore, an eNB cannot indicate that a UE capability bandwidth has which band in detail using only the fourth one bit. Accordingly, even in this case, whether an RS is transmitted in a UE capability bandwidth may be indicated, and a UE may detect an accurate location using a blind detection method.

As an alternative method, if one bit is further added and used, information about the use of the "RS non-transmission type" may be explicitly notified. Furthermore, if the number of bits is increased, information about the location of a bandwidth may be notified although an RS is transmitted only in a partial bandwidth. In this case, the entire overload of a system should be taken into consideration.

The second method for an eNB to provide a UE with type information using DCI is described below.

In the second method, a method using only the three bits of the four bits may be selected. For example, the first bit may be set to determine whether a type is the "1-symbol RS transmission type" or the "plural symbol RS transmission type." The second bit may be set to indicate whether density will be increased in the time domain. The third bit may be set to indicate whether density will be increased in the frequency domain.

In the second method, in transmitting type information through DCI, the remaining parts other than the classifications using the three bits may be configured to satisfy the worst conditions.

A method using a piece of system information signaling/RRC signaling for each connected UE without using DCI may be selected. If the information is provided to each UE as described above, more accurate information can be transmitted because information about the density/pattern of an MRS can be transmitted through a data channel. For example, the location of the transmission bandwidth of an MRS, the number of symbols including an MRS in each subframe to which an MRS has been allocated, and information about the density of MRSs in the frequency/time domain can be transmitted through UE capability information. Furthermore, in the case of the "RS non-transmission type", type information can be explicitly transferred to each UE.

Figure 9A:
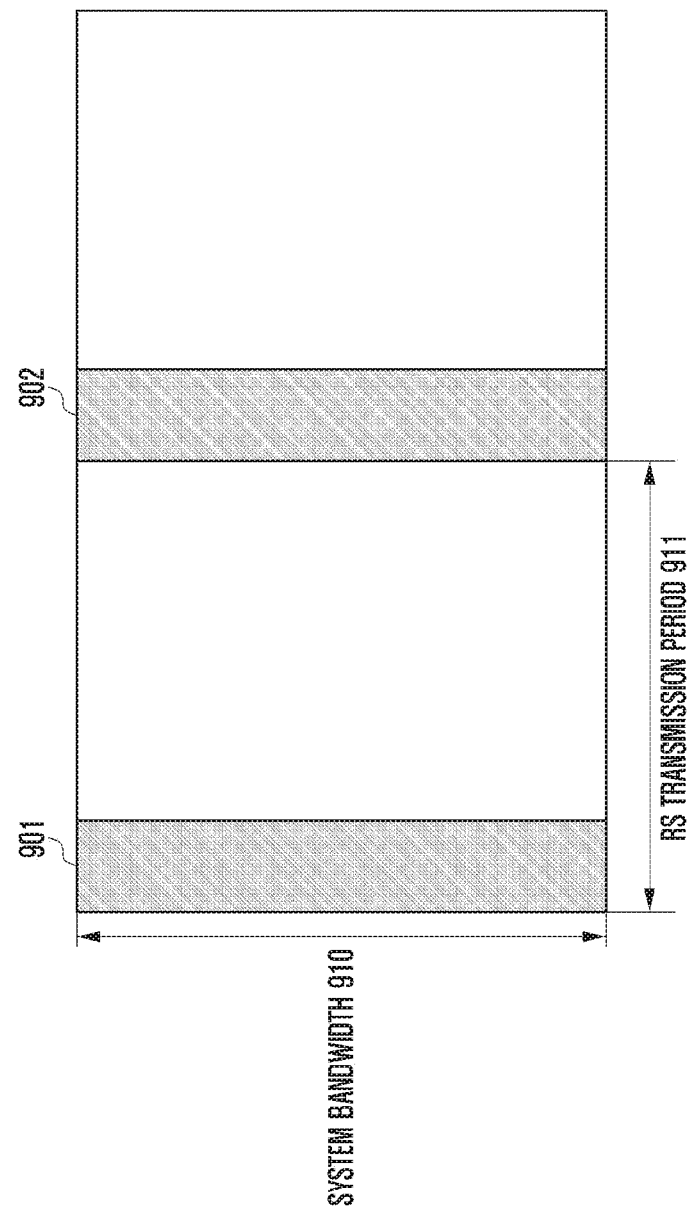

If type information and a change of density are excluded, the aforementioned methods of transmitting an RS may have forms, such as those of FIGS. 9A and 9B.

FIGS. 9A and 9B are diagrams for illustrating the transmission band of an RS according to an embodiment of the present disclosure.

As described above, FIG. 9A illustrates a case where an RS is transmitted in each subframe 901, 902 in each RS transmission period 911 in a full system bandwidth 910. Compared to FIG. 9A, in FIG. 9B, subframes 903 and 904 including RSs are transmitted only within UE capability bandwidth 921. That is, if data transmission is performed in a bandwidth in which an RS is not transmitted in the same subframe 903 and 904 including RSs, a corresponding band may be the RS non-transmission type. In general, in the case of FIG. 9B, data transmission is not performed in a region other than the UE capability bandwidth 921.

Furthermore, the UE capability bandwidth 921 may be different depending on an active UE located within an eNB. For example, one UE may preempt the entire UE capability bandwidth 921 or the bandwidths of a plurality of UEs may have been configured to overlap or in common within the UE capability bandwidth 921.

FIG. 9C shows a case including a band in which essential system information is additionally transmitted in addition to the UE capability bandwidth 921. In general, a physical broadcast channel (PBCH) for transmitting the essential system information is transmitted in a band that may be received by all of UEs. Accordingly, the UE capability bandwidth 921 and the band of the PBCH 920 may overlap. FIG. 9C illustrates a case where the UE capability bandwidth 921 and the band of the PBCH 920 do not overlap. Furthermore, if the PBCH is transmitted as illustrated in FIG. 9C, additional information can be received in addition to an MRS from the point of view of a UE because the PBCH can be additionally used. Accordingly; performance of an MRS can be improved.

Figure 10A:
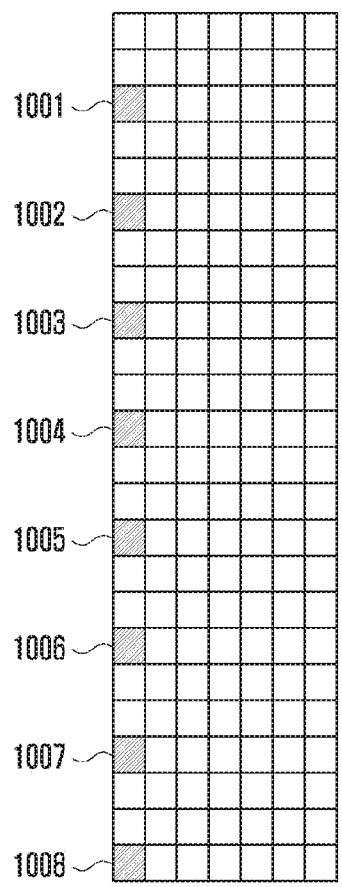
FIGS. 10A-10C are diagrams illustrating a method of generating and allocating an MRS sequence according to an embodiment of the present disclosure.
Figure 10B:
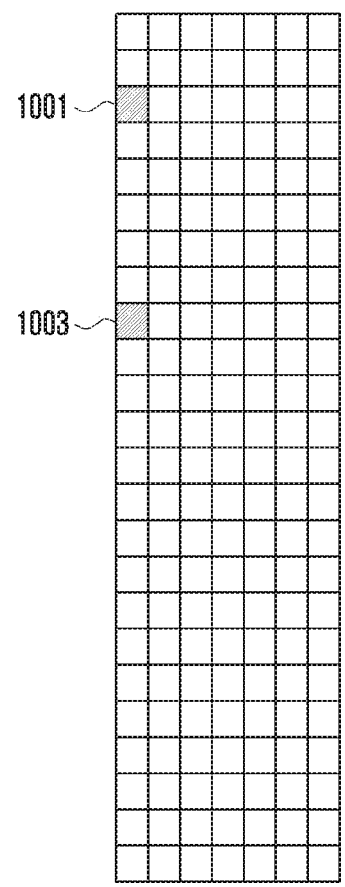
Figure 10C:
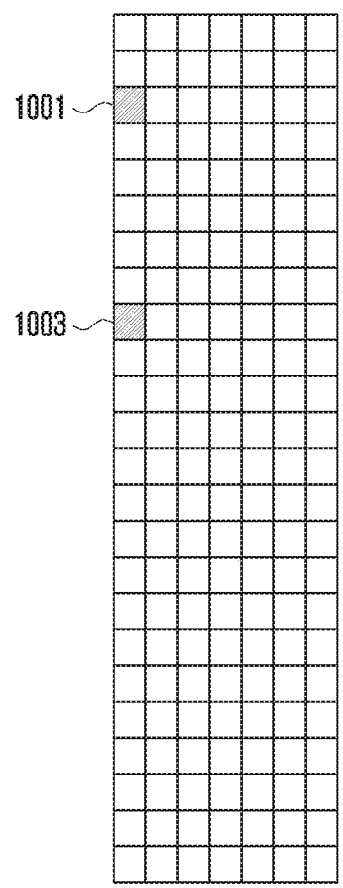

FIGS. 10A-10C are diagrams illustrating a method of generating and allocating an MRS sequence according to an embodiment of the present disclosure.

First, FIG. 10A may be the first subframe included in an RS transmission period, and illustrates a case where eight MRSs 1001 to 1008 are included in the first OFDM symbol of the first subframe. In FIG. 10, one square block may be one resource element (RE). Accordingly, as illustrated in FIG. 10A, one subframe may include REs in which the MRSs are transmitted and REs in which data/control signal are transmitted. In this case, since the form in which the MRS is transmitted is described, only the form of the MRS is described with reference to FIG. 10A.

As in FIG. 10A, the MRSs may be generated with reference to a reference full-band. The MRSs generated as described above may become reference sequences. A method of generating the reference sequences may have various forms, and thus a detailed description thereof is omitted.

Each MRS generated as the reference sequence has a different form. That is, if the MRS 1001 has a value of r(1), the MRS 1002 has a value of r(2), the MRS 1003 has a value of r(3), the MRS 1004 has a value of r(4), the MRS 1005 has a value of r(5), the MRS 1006 has a value of r(6), the MRS 1007 has a value of r(7), and the MRS 1008 has a value of r(8).

FIG. 10A corresponds to a case where the reference sequences are generated according to a method having the highest frequency density in the entire system band. That is, a sequence having the highest density is previously generated as a reference sequence. Thereafter, FIGS. 10B and 10C illustrate a method of generating an RS if the RS is transmitted only in a partial band based on a UE bandwidth after generating a reference sequence as in FIG. 10A.

In FIGS. 10B and 10C, if the density of RSs to be transmitted in a partial band configured based on reference sequences generated as in FIG. 10A is low, that is, if the density of RSs is ½ of the reference sequences, the same RS is configured to be located at the same location as in FIG. 10B, and the place into which an RS is not inserted is punctured. Furthermore, new sequences may be generated by truncating reference sequences included in other places other than a configured band. That is, in the case of FIG. 10B, MRSs transmitted in a partial band may be the signals 1001 and 1003.

The case of FIG. 10C is different from that of FIG. 10B. That is, the FIG. 10C has a form in which if the density of RSs to be transmitted in a partial band configured based on reference sequences generated as in FIG. 10A based the previously generated reference sequences is low, that is, if the density of RSs is ½ of the reference sequences, reference MRSs are inserted into the locations in which the sequences should be transmitted in order of the sequences generated as in FIG. 10C. Accordingly, in the case of FIG. 10C, MRSs transmitted in a partial band may be the signals of 1001 and 1002.

A case where the method of generating a new MRS sequence based on the puncturing described with reference to FIGS. 10A-10C is used is described in more detail.

In the case of the "1-symbol RS transmission type", such as FIG. 10A, and the "plural symbol RS transmission type" although not illustrated in the drawings, it is evident that a new MRS sequence may be generated using the methods of FIGS. 10A-10C.

An MRS sequence used for an MRS is generated as in FIG. 10A using an MRS pattern having the highest frequency/time density in a full bandwidth as a reference pattern. In the case of FIG. 10B, the same MRS value may be allocated to the same resource element (RE) in the reference pattern. In this case, puncturing is performed in some regions because the density of frequency resources has a low form. Since the same MRS value is allocated to the same resources as in the case of FIG. 10B, MRS sequences corresponding to all of types can be shared by sharing/obtaining the least information for generating RSs. Furthermore, the case of FIG. 10C is another embodiment in which an MRS sequence is generated and allocated, and corresponds to a case where generated sequences are sequentially inserted into the locations where they will be inserted.

A method for an eNB and a UE to obtain type information through the sharing of the least information is described below. In general, all of eNBs have their own unique cell Ms. Furthermore, data is transmitted/received in transmitted resources using a subframe or/and slot number. Accordingly, an eNB may generate an MRS sequence using a cell ID and subframe/slot number based on a maximum bandwidth of a system, or may gene an MRS sequence using a cell ID, subframe/slot number and system bandwidth information. REs for the generated MRS sequence may be allocated as in Equation 1 below.

$$a_{k,l} = r_{l,n_s}(m)$$

$$k = nm + (v + v_{shift}) \bmod n$$

$$l = 0, N_{sym}^{DL} - r(ex, r=3)$$

$$m = 0, 1, \ldots, q \cdot N_{RB}^{DL} - 1 \qquad \text{Equation 1}$$

In Equation 1, $a_{k,l}$ is a complex-valued modulation symbol used as a reference symbol, and $r_{l,n_s}$ is an RS sequence. Furthermore, k is a subcarrier index, v is a value indicative of a position in the frequency domain, and $v_{shift}$ is $N_{ID}^{cell}$ mod n. In this case, $N_{ID}^{cell}$ is a physical layer cell identity. Furthermore, "mod" means modulo operation, and n is density in the frequency domain, and is the interval value of an RE for allocating an RS. Furthermore, l is density in the time domain and may be a value of the number of OFDM symbols within a subframe or slot. Furthermore, q is the number of REs to which an RS has been allocated within one OFDM of a resource block, and $N_{RB}^{DL}$ is the number of RBs of a system.

Figure 11A:
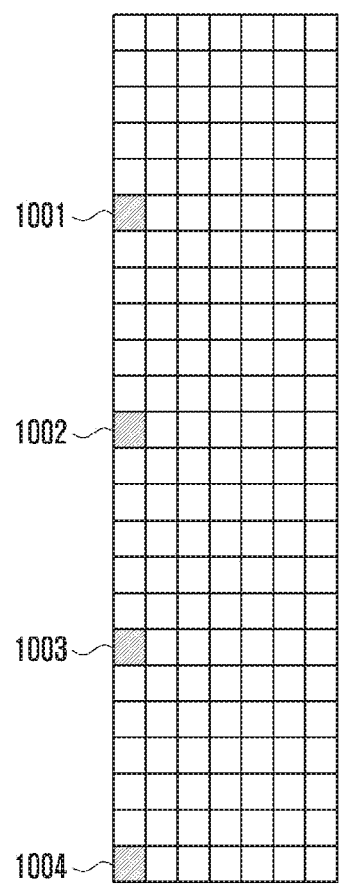
FIGS. 11A-11B are diagrams for illustrating a method of generating an RS sequence according to an embodiment of the present disclosure.
Figure 11B:
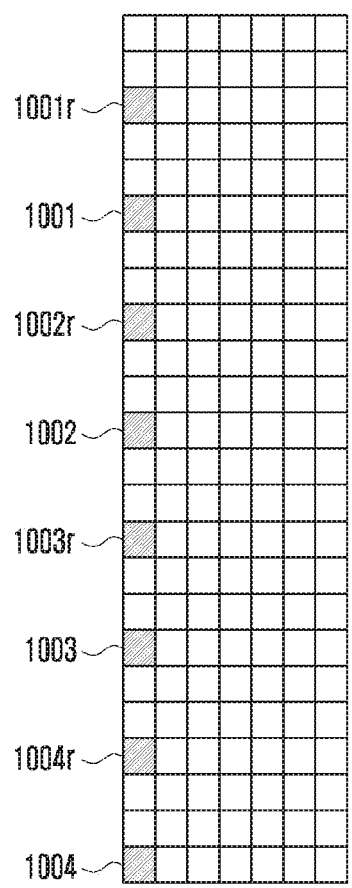

FIGS. 11A and 11B are diagrams for illustrating a method of generating an RS sequence according to an embodiment of the present disclosure.

The case of FIG. 11A corresponds to reference sequences, and the case of FIG. 11B may correspond to a case where new sequences have been generated using the reference sequences. First, in the reference sequences, MRSs are generated to have the lowest density in a full band or partial band of a system. That is, as illustrated in FIG. 11A, 1001, 1002, 1003 and 1004 may be the MRSs.

Thereafter, if a reference sequence having twice density in the frequency domain is to be generated, the reference sequence may be configured to be repeatedly inserted in the frequency domain using the reference sequence as in FIG. 11B. In FIG. 11B, 1001r refers to an MRS, that is, the repetition of 1001. That is, compared to the case of FIG. 11A, that is, the reference sequence, in FIG. 11B, MRSs may be configured to have the sequences of 1001r, 1001, 1002r, 1002, 1003r, 1003, 1004r and 1004.

If the reference sequences illustrated in FIG. 11A correspond to a partial band, they may be generated in a full band by repeating using the reference sequences and transmitted. Furthermore, repetition in the time domain may correspond to the repetition of FIG. HA or the repetition of FIG. 11B. Accordingly, after one reference sequence is generated, a new sequence may be generated using the generated reference sequence.

Figure 12:
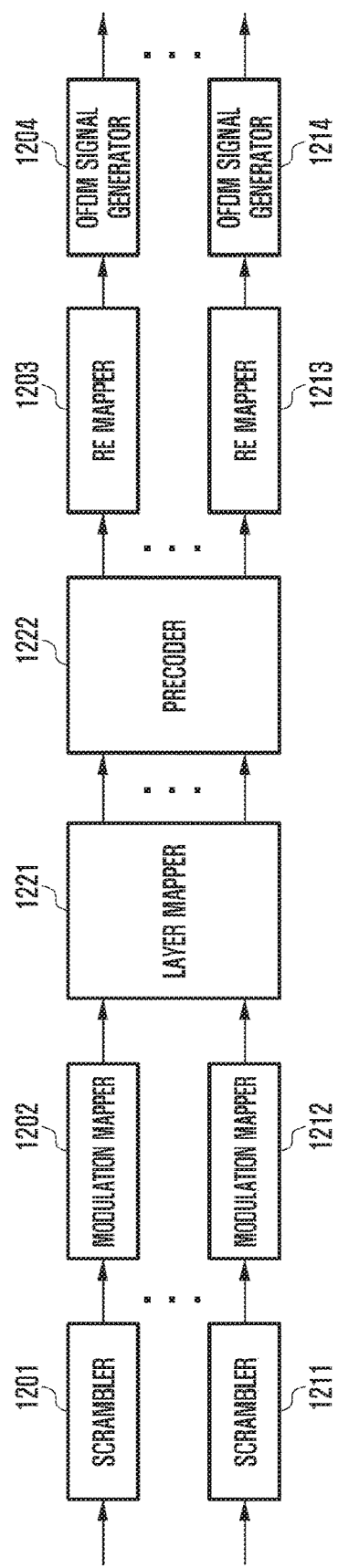
FIG. 12 is a diagram illustrating a partial configuration of a data processor if different types of services are supported according to an embodiment of the present disclosure.

FIG. 12 is a diagram illustrating a partial configuration of the data processor if different types of services are supported according to an embodiment of the present disclosure.

Referring to FIG. 12, there is provided a plurality of scramblers 1201-1211 configured to scramble data to be transmitted. The scrambled signals are input to a plurality of modulation mappers 1202-1212, respectively. The plurality of modulation mappers performs mapping for modulation and outputs the signals. The signals output by the modulation mappers 1202-1212 are input to a layer mapper 1221. The layer mapper 1 may map signals to be transmitted according to a corresponding layer and output the signals. Thereafter, the output of the layer mapper is input to a precoder 1222. Furthermore, a DMRS for an enhanced Mobile Broadband (eMBB) service may be inserted as another input of the precoder 1222. The DMRS for the eMBB service may be provided by the controller 330 or may be provided by another controller within the data processor 320. Control of the data processor 320 is basically performed under the control of the controller 330, and thus the data processor 320 is hereinafter illustrated as being controlled by the controller 330 for convenience of description.

Furthermore, the precoder 1222 may perform precoding using the input signals, may output an MRS for an ultra reliable and low latency communications (URLLC) service, that is, another service, into the signals, and may output them. In this case, the characteristics of the eMBB service and the URLLC service are described in brief below.

The URLLC service is based on channel estimation of high reliability for reliable data transmission. Accordingly, in the case of the URLLC service, a DMRS having higher density in the frequency/the time domain than in an eMBB region should be transmitted. In particular, the URLLC service assumes high density and DMRS transmission of a short period in the frequency domain. Accordingly, it is expected that in the case of the URLLC service, RS overhead will increase. In order to solve this problem, as illustrated in FIG. 12, the precoder 1222 does not perform precoding on both MRSs for eMBB and URLLC, but performs precoding on a DMRS for eMBB, transmits the DMRS, and transmits a DMRS for URLLC without performing precoding on the DMRS for URLL. Furthermore, the MRS for URLLC maintains the same density as the MRS for eMBB, and the MRS is used along with the DMRS for channel estimation. In this case, overhead of the DMRS can be reduced.

Thereafter, RE mappers 1203, . . . , 1213 may map the respective signals to corresponding resource elements. The resource elements may be input to OFDM signal generators 1204, . . . , 1214, thereby generating OFDM signals.

As described above, the DMRS for the URLLC service uses a joint with the MRS. Accordingly, REs can be allocated so that a UE can perform more accurate channel estimation upon performing the channel estimation for demodulation.

Services having opposite characteristics, such as the URLLC service and the eMBB service described with reference to FIG. 12, are referred to as vertical services. In order to provide such a vertical service, two methods of operating an MRS and a DMRS may be used.

The first method is a method of allocating an additional RS, that is, a DMRS, to an RE neighboring an allocated MRS in the time axis if the URLLC service is supported in the region in which an MRS is present and repeatedly transmitting a pattern of the joint of an MRS and a DMRS used if the URLLC service is supported in the region where an MRS is present if the URLLC service is supported in the region where an MRS is not present.

Figure 13A:
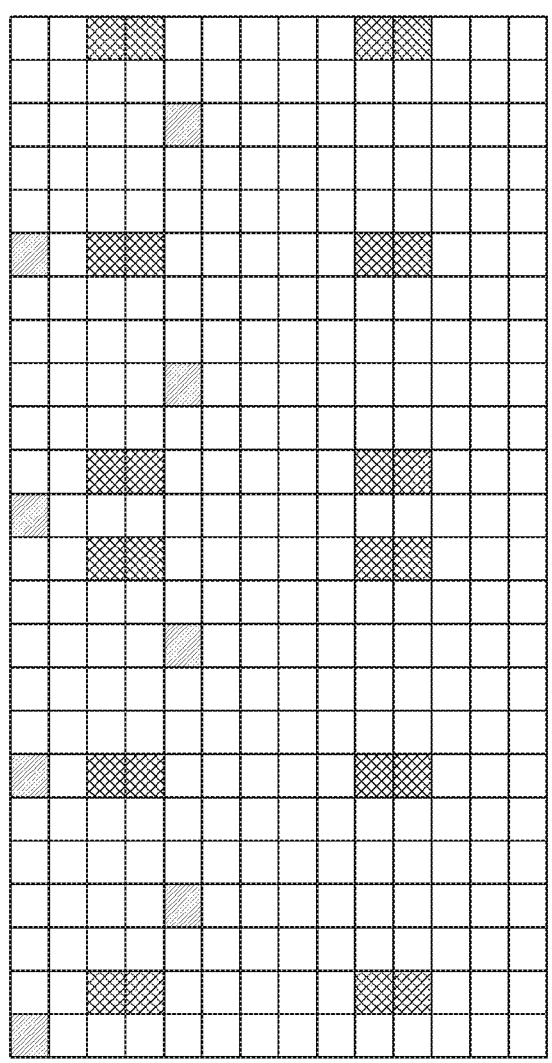
FIGS. 13A to 13E are diagrams for illustrating a method of allocating MRSs and DMRSs when a vertical service is provided according to an embodiment of the present disclosure.

FIGS. 13A to 13E are diagrams for illustrating a method of allocating MRSs and DMRSs when the vertical service is provided according to an embodiment of the present disclosure. As in FIG. 13A, MRSs may be allocated according to the aforementioned MRS density and pattern configuration methods. In H.& 13A, DMRSs have been additionally allocated in addition to the MRSs. FIG. 13A is a diagram illustrating a case where only the eMBB service is provided. Accordingly, UEs provide with the eMBB service may use information of additional DMRSs in addition to the MRSs.

Figure 13B:
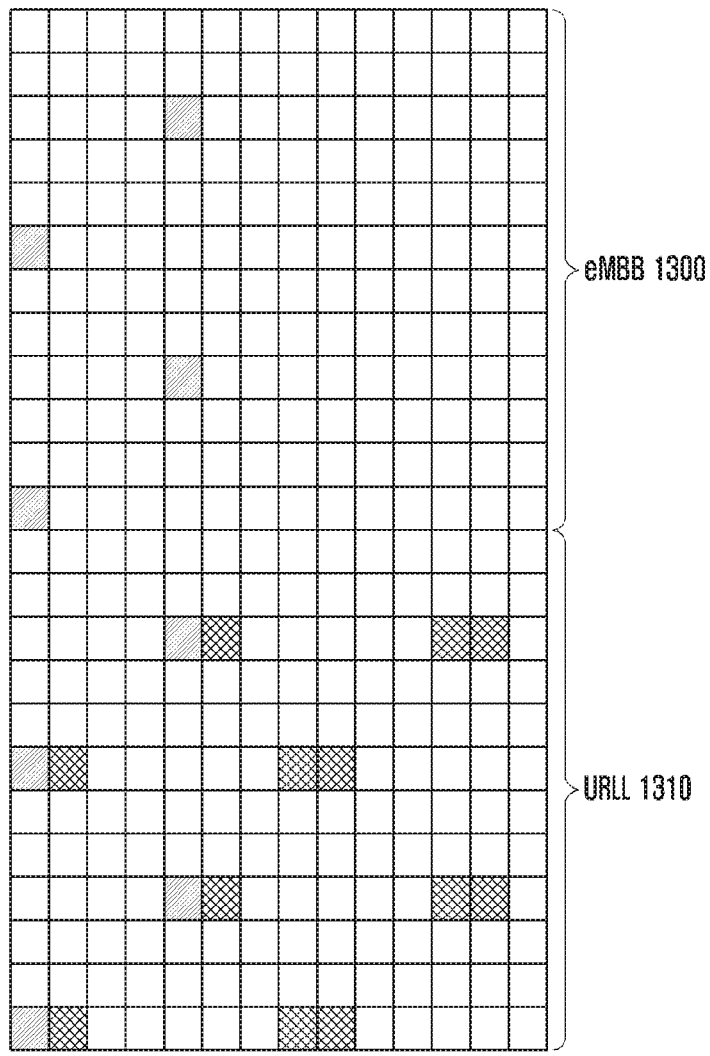

FIG. 13B illustrates a case where only the URLLC service is provided in a specific band. In an URLLC service band 1310, an additional DMRS may be transmitted in the existing MRS transmitted to provide the URLLC service. In this case, the DIVERS may be applied only in the same frequency RE at a point consecutive to each MRS only in the band 1310 in which the URLLC service is provided. If two RSs are used as described above, a UE can restore data more effectively and reliability can be improved. Furthermore, it may be seen that for higher reliability, more patterns for the DMRS have been allocated to one subframe compared to the case of the eMBB service.

Figure 13C:
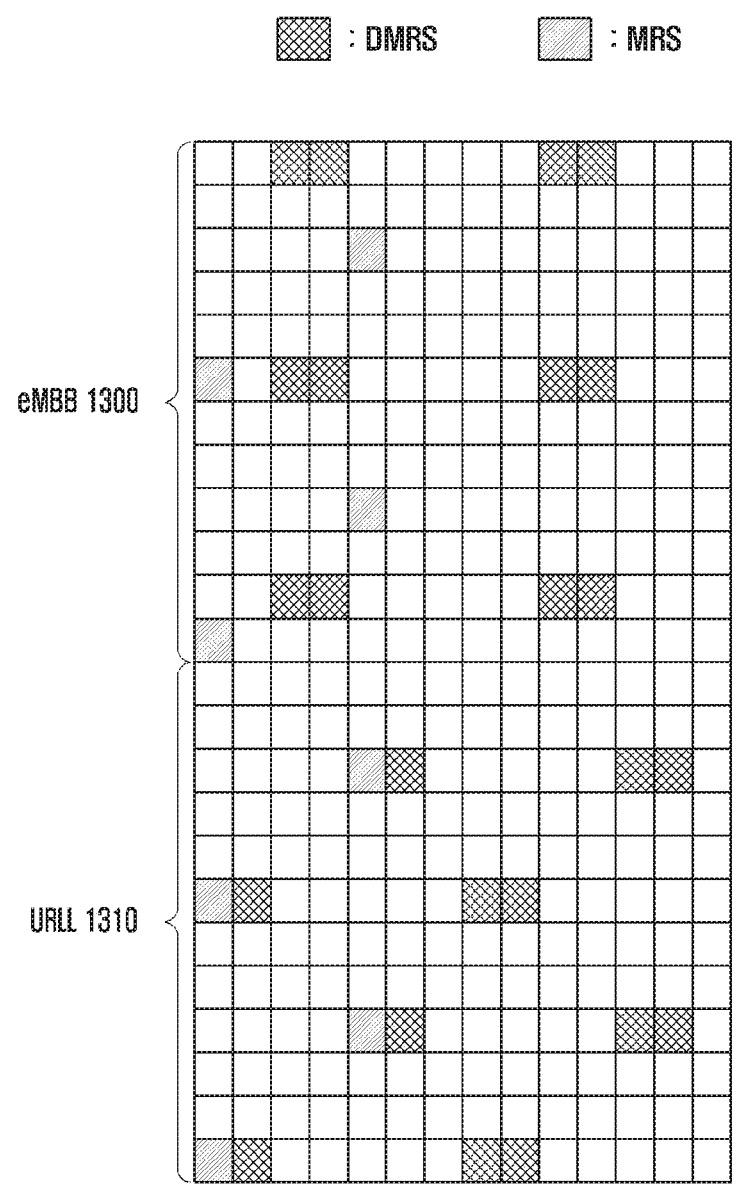

FIG. 13C illustrates a case where bands are separately configured if the eMBB service and the URLLC service are mixed. That is, some DMRSs in addition to MRSs have been allocated to a frequency band 1300 providing the eMBB service. Furthermore, DMRSs in addition to MRSs are allocated to a band 1310 for the URLLC service that assumes higher reliability as FIG. 13B.

Figure 13D:
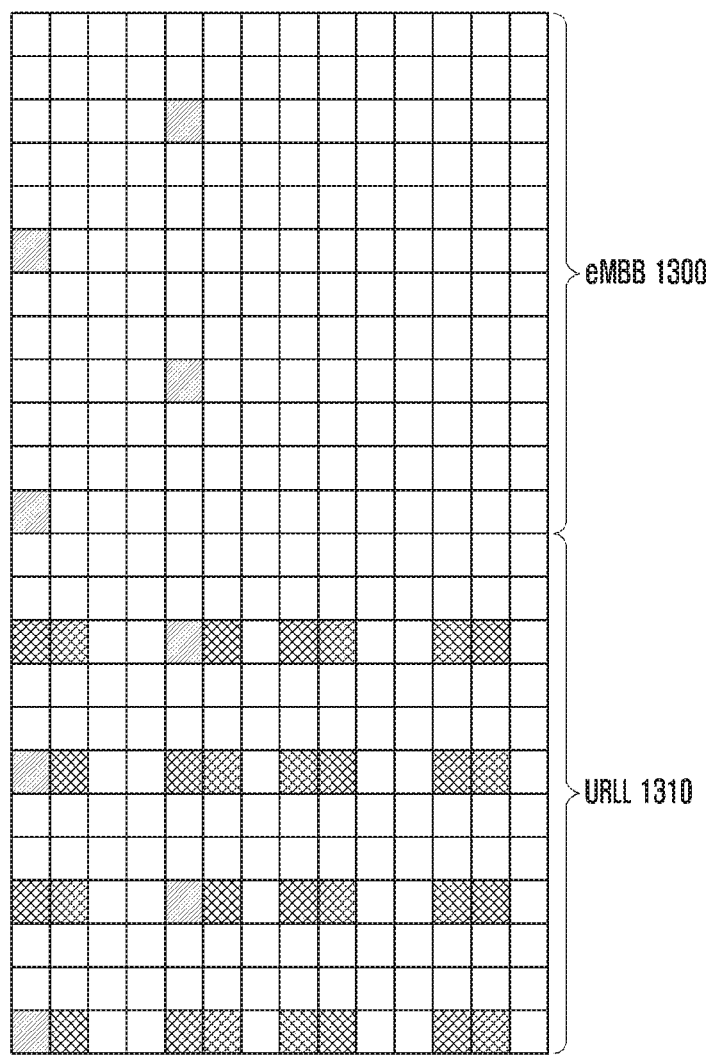
Figure 13E:
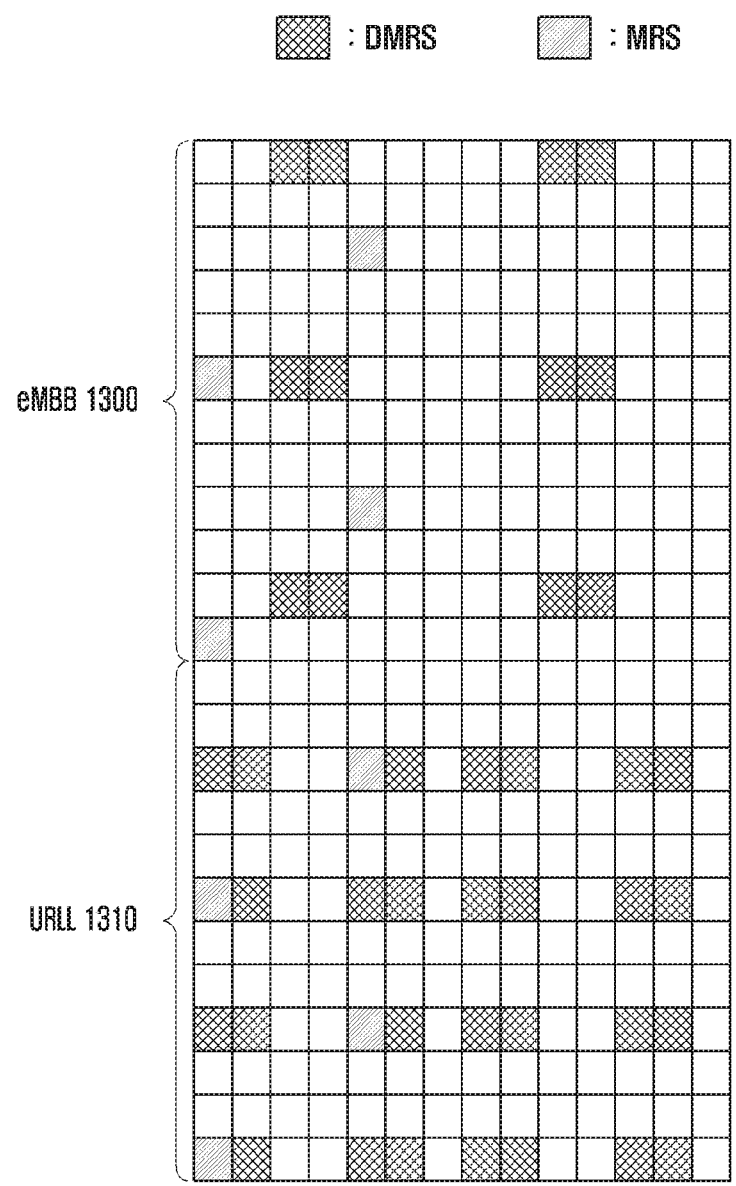

FIG. 13D illustrates a case where more DMRSs are required in accordance with the URLLC service. That is, FIG. 13D shows a case where RSs of high density are required compared to the case of FIG. 13B. In this case, it is evident that the patterns may be allocated to REs of a different band not the same REs as in FIG. 13D. FIG. 13E is a diagram illustrating a case where MRSs and DMRSs have been allocated to an URLLC service band 1310 and an eMBB service band 1300 if the eMBB service and URLLC service that assumes DMRSs of very high density as in FIG. 13D are mixed.

FIGS. 14A to 14E are diagrams for illustrating another method of allocating MRSs and DMRSs when a vertical service is provided according to an embodiment of the present disclosure.

Figure 14A:
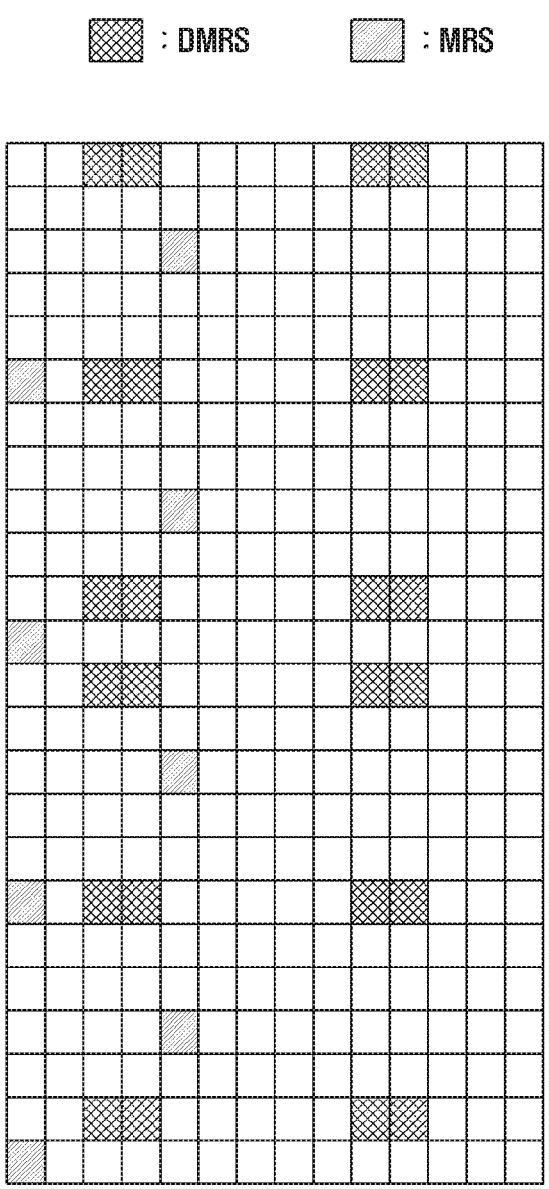
FIGS. 14A to 14E are diagrams for illustrating another method of allocating MRSs and DMRSs when a vertical service is provided according to an embodiment of the present disclosure.

As in FIG. 14A, MRSs may be allocated according to the aforementioned MRS density and pattern configuration methods. In FIG. 14A, DMRSs have been additionally allocated in addition to MRSs. FIG. 14A is a diagram illustrating a case where only the eMBB service is provided. Accordingly, UEs provided with the eMBB service can use information of the additional DMRSs in addition to the MRSs.

Figure 14B:
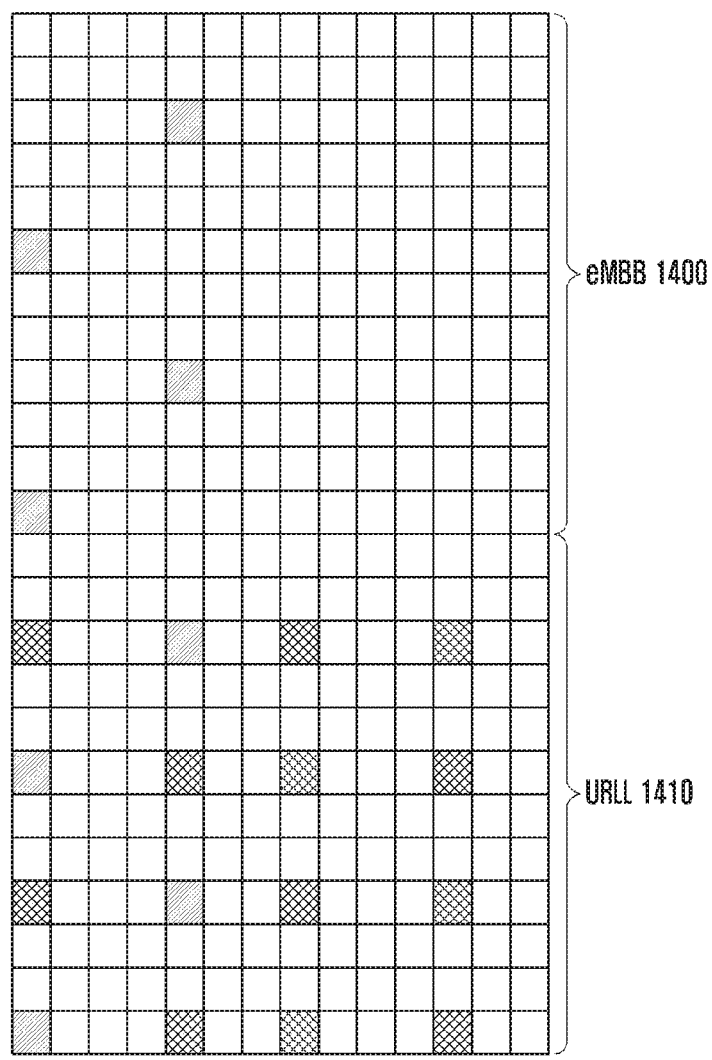

FIG. 14B illustrates a case where only the URLLC service is provided in a specific band. An additional DMRS may be transmitted in the existing MRS transmitted to provide the URLLC service in an URLLC service band 1410. In this case, DMRSs used for a frequency band and time band are added to the band 1410 provided by the URLLC service. That is, more REs may be allocated in an additional frequency axis in a band in which an MRS is present, and DMRSs may be added in the region in which an MRS is not present so that a form of a DMRS added to the MRS is obtained. If a large number of RSs are used as described above, a UE can restore data more effectively and reliability can be improved.

Figure 14C:
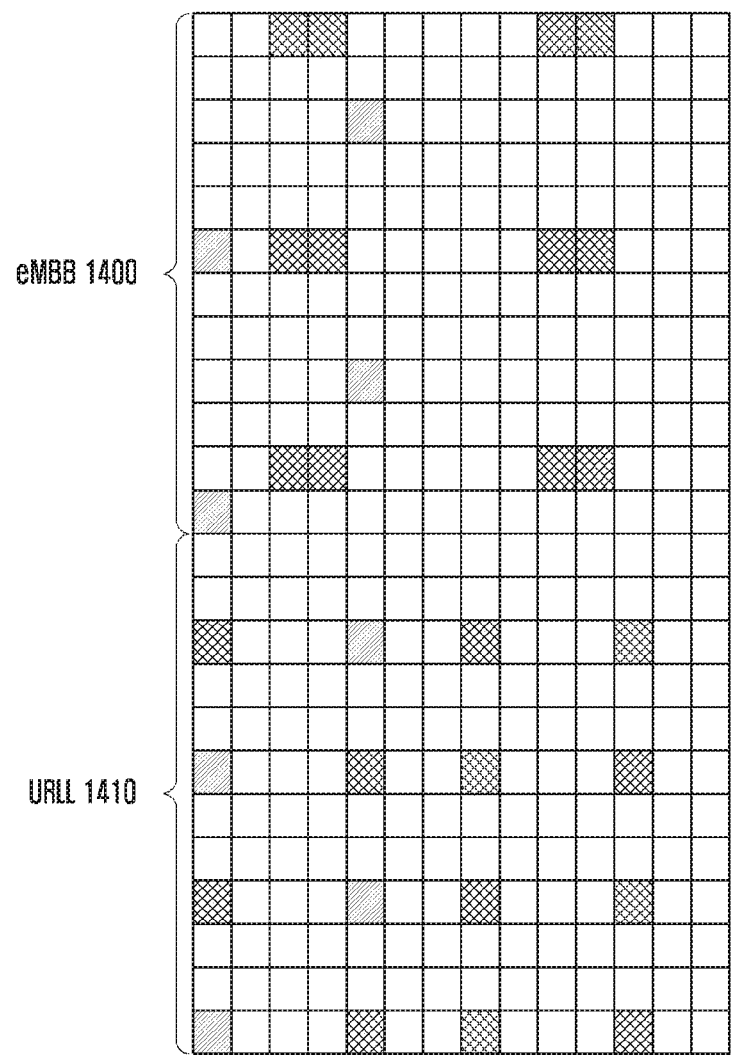

FIG. 14C illustrates a case where bands are separately configured if the eMBB service and the URLLC service are mixed. That is, DMRSs have been allocated to a frequency band 1400 that provides the eMBB service as in the case of FIG. 14B in addition to MRSs.

Figure 14D:
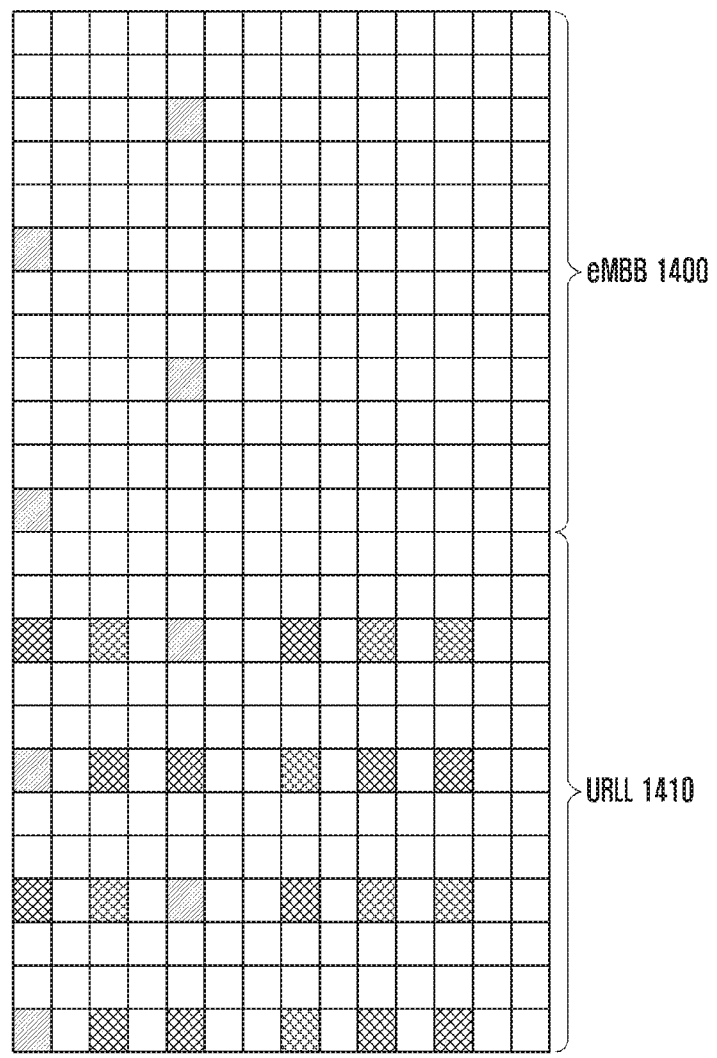
Figure 14E:
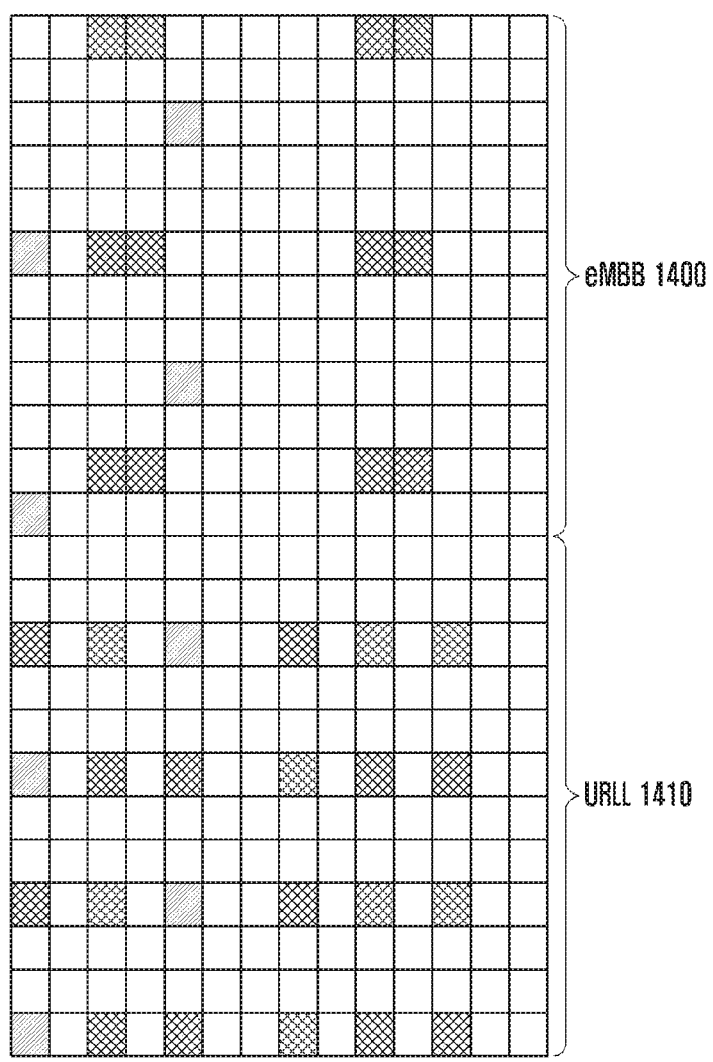

FIG. 14D illustrates a case where more DMRSs are required in accordance with the URLLC service. That is, FIG. 14D corresponds to a case where RSs of high density are required compared to the case of FIG. 14B. In this case, it is evident that the patterns may be allocated to REs of a different band not the same REs as in FIG. 14D. FIG. 14E is a diagram illustrating a case where MRSs and DMRSs have been allocated to an URLLC service band 1410 and an eMBB service band 1400 if the eMBB service and the URLLC service that assumes DMRSs of very high density as in FIG. 14D are mixed.

Furthermore, the aforementioned RS proposed according to an embodiment of the present disclosure may be used as a demodulation RS (DIVERS) in addition to the aforementioned contents, and can be flexibly managed by applying the same method.

In accordance with the embodiments of the present disclosure, a next-generation wireless communication system can reduce overhead of an RS and thus can minimize an always-on signal and reduce interference between neighboring cells. Furthermore, by transmitting the transmission of an RS, energy consumption of a network can be reduced and frequency efficiency and user throughput in a cell edge can be improved. Furthermore, a next-generation wireless communication system to which the embodiments of the present disclosure are applied can support forward compatibility when an RS is transmitted, and can support services for a user who requires different performance and is located in various environments using a new wide system bandwidth (BW) and carrier frequency. Furthermore, in accordance with the embodiments of the present disclosure, an RS may be used as a demodulation RS (DMRS) and can be flexibly managed by applying the same method.

Furthermore, the embodiments disclosed in this specification and drawings propose only specific examples in order to easily describe the contents of the present disclosure and help understanding, and the embodiments are not intended to restrict the range of right of the present disclosure. Accordingly, it should be understood that all modifications or variations derived based on the technological spirit of the present disclosure in addition to the disclosed embodiments should be construed as being included in the present disclosure.

What is claimed is:

1. A method for an eNB to generate a reference signal (RS) in a wireless communication system, the method comprising:
receiving, from a user equipment (UE), UE status information including bandwidth information available for communication at the UE;
determining a density and a pattern of the RS for a first bandwidth corresponding to the bandwidth information included in the UE status information, based on the received UE status information and previously stored status information of active UEs;
providing information about the determined density and pattern of RS to at least one active UE within a coverage area of the eNB;
transmitting the RS in a predetermined period based on the determined density and pattern; and
transmitting the RS based on the determined density and pattern and data to be provided to the at least one active UE.

2. The method of claim 1, wherein the UE status information comprises UE capability information and comprises at least one of UE mobility or frequency selectivity.

3. The method of claim 1, wherein the first bandwidth belongs to a partial bandwidth of a full bandwidth of the eNB.

4. The method of claim 1, wherein the information about the density and pattern of the RS is provided as downlink control information.

5. The method of claim 4, wherein the downlink control information comprises at least one of a 1-symbol reference signal transmission type, information indicative of a plural symbol reference signal transmission type, information indicative of the density of the RS in a time domain, or information indicative of the density of the RS in a frequency domain.

6. The method of claim 1, wherein the information about the density and pattern of the RS is provided to each active UE using system information signaling.

7. The method of claim 1, further comprising:
checking whether a change of the density and pattern of the RS is necessary when the UE status information is received from another active UE after the density and pattern of the RS are determined;
transmitting information about the changed density and pattern of the RS to at least one active UE within the coverage area of the eNB if a change of the density and pattern of the RS is necessary;
transmitting the RS in a predetermined period based on the changed density and pattern; and
transmitting data to be provided to the at least one active UE based on the changed density and pattern.

8. The method of claim 7, further comprising adjusting the density and pattern of the RS through puncturing or repetition based on density and pattern information from a predetermined reference sequence when the density and pattern of the RS are changed.

9. The method of claim 1, further comprising allocating a demodulation reference signal (DMRS) based on vertical services in addition to the RS if two different types of services are requested by at least one active UE, and the services are vertical services.

10. The method of claim 9, wherein the vertical services comprise an enhanced mobile broadband (eMBB) service and an ultra-reliable and low-latency communications (URLLC) service.

11. An eNB apparatus for generating a reference signal (RS), comprising:
a wireless signal processor configured to:
convert user equipment (UE) status information received from at least one UE into a signal of a baseband,
perform band up-conversion and amplification using transmission power on subframes comprising the RS, and
output the signal;
a data processor configured to:
convert the UE status information into a digital signal,
output the digital signal,
determine a density and pattern of the RS, and
output the determined density and pattern;
memory configured to store UE status information of active UEs; and
a controller configured to control to:
determine the density and the pattern of the RS for a first bandwidth corresponding to bandwidth information included in the UE status information, based on the received UE status information and the UE status information of the active UEs stored in the memory,
provide information about the determined density and pattern of the RS to at least one active UE within a coverage area of an eNB,
transmit the RS in a predetermined period based on the determined density and pattern, and
transmit the RS based on the determined density and pattern and data to be provided to the at least one active UE.

12. The eNB apparatus of claim 11, wherein the UE status information comprises UE capability information and comprises at least one of UE mobility or frequency selectivity.

13. The eNB apparatus of claim 11, wherein the first bandwidth belongs to a partial bandwidth of a full bandwidth of the eNB.

14. The eNB apparatus of claim 11, wherein the controller is configured to control information about the density and pattern of the RS to be provided as downlink control information.

15. The eNB apparatus of claim 14, wherein the downlink control information comprises at least one of a 1-symbol reference signal transmission type, information indicative of a plural symbol reference signal transmission type, information indicative of the density of the RS in a time domain, or information indicative of the density of the RS in a frequency domain.

16. The eNB apparatus of claim 11, wherein the controller is configured to control information about the density and pattern of the RS to be provided to each active UE using system information signaling.

17. The eNB apparatus of claim 11, wherein the controller is configured to:
control whether a change of the density and pattern of the RS is necessary to be checked when the UE status information is received from another active UE after the density and pattern of the RS are determined,
control information about the changed density and pattern of the RS to be transmitted to at least one active UE within a coverage area of the eNB if a change of the density and pattern of the RS is necessary,
control the RS to be transmitted in a predetermined period based on the changed density and pattern, and control data to be provided to the at least one active UE to be transmitted based on the changed density and pattern.

18. The eNB apparatus of claim 17, wherein the controller is configured to control the density and pattern of the RS to be adjusted through puncturing or repetition based on density and pattern information from a predetermined reference sequence when the density and pattern of the RS are changed.

19. The eNB apparatus of claim 11, wherein the controller is configured to control a demodulation reference signal (DMRS) to be allocated based on vertical services in addition to the RS if two different types of services are requested by at least one active UE and the services are vertical services.

20. The eNB apparatus of claim 19, wherein the vertical services comprise an enhanced mobile broadband (eMBB) service and an ultra-reliable and low-latency communications (URLLC) service.

* * * * *